US008436926B2

(12) United States Patent
Mabuchi

(10) Patent No.: US 8,436,926 B2
(45) Date of Patent: *May 7, 2013

(54) PHYSICAL QUANTITY DETECTING DEVICE, SOLID-STATE IMAGING DEVICE, AND IMAGING APPARATUS

(75) Inventor: Keiji Mabuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/479,374

(22) Filed: May 24, 2012

(65) Prior Publication Data

US 2012/0236188 A1    Sep. 20, 2012

Related U.S. Application Data

(62) Division of application No. 11/844,499, filed on Aug. 24, 2007, now Pat. No. 8,203,634.

(30) Foreign Application Priority Data

Aug. 31, 2006 (JP) .................................. 2006-234825
Feb. 8, 2007 (JP) .................................. 2007-028747

(51) Int. Cl.
*H04N 5/335*    (2011.01)
*H04N 3/14*    (2006.01)

(52) U.S. Cl.
USPC ........................................ 348/294; 348/312

(58) Field of Classification Search .................. 348/294, 348/296, 302, 312
See application file for complete search history.

(56) References Cited

U.S. PATENT DOCUMENTS

| 5,585,844 | A | 12/1996 | Hieda et al. |
| 7,244,921 | B2 | 7/2007 | Mabuchi |
| 2003/0076437 | A1 | 4/2003 | Karasaki et al. |
| 2003/0218687 | A1 | 11/2003 | Sato |
| 2006/0266923 | A1 | 11/2006 | Mabuchi |
| 2009/0190012 | A1* | 7/2009 | Mabuchi et al. ............. 348/294 |
| 2011/0249164 | A1* | 10/2011 | Koizumi et al. ............. 348/308 |

FOREIGN PATENT DOCUMENTS

JP    2006-333035    12/2006

OTHER PUBLICATIONS

Orly Yadid-Pect and Eric R. Fossum; Wide Intrascene Dynamic Range CMOS APS Using Dual Sampling; IEEE Transactions on Electron Devices; vol. 44, No. 10.

* cited by examiner

*Primary Examiner* — Hung Lam
(74) *Attorney, Agent, or Firm* — Dentons US LLP

(57) ABSTRACT

A physical quantity detecting device includes a pixel array and a vertical driving circuit. In the pixel array, pixels each for converting a physical quantity supplied from the outside into an electric signal and storing the electric signal are two-dimensionally arranged in a matrix. The vertical driving circuit scans a plurality of sets of read rows so that a storage time for each of the electric signals differs from one another and performs a shutter operation on a shutter row in synchronization with a readout operation performed on the corresponding set of read rows out of the plurality of sets of read rows during 1H period that is a unit of time of scanning.

7 Claims, 19 Drawing Sheets

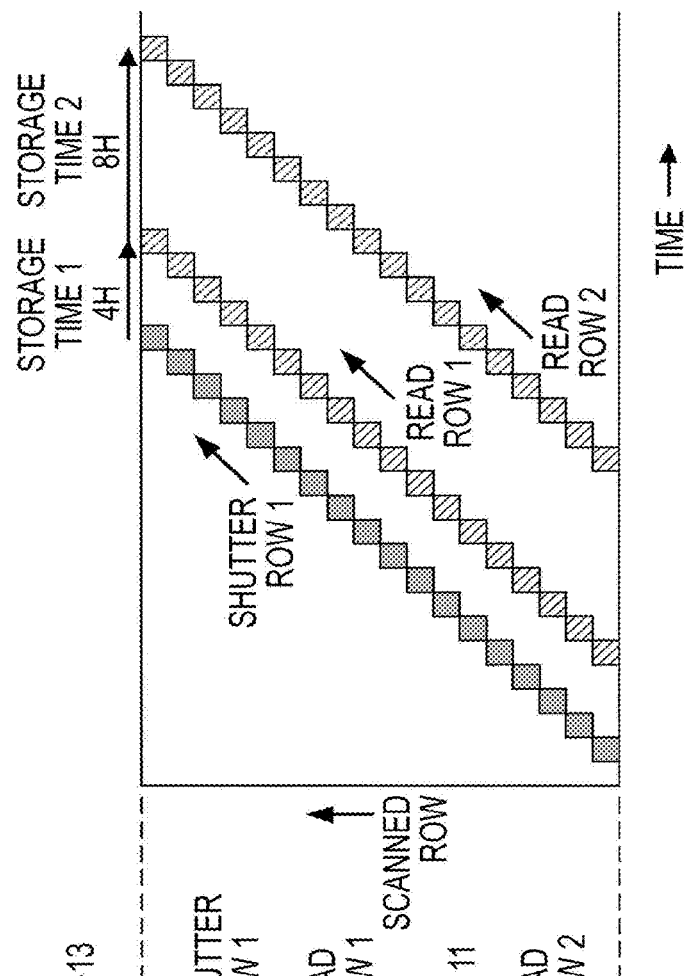
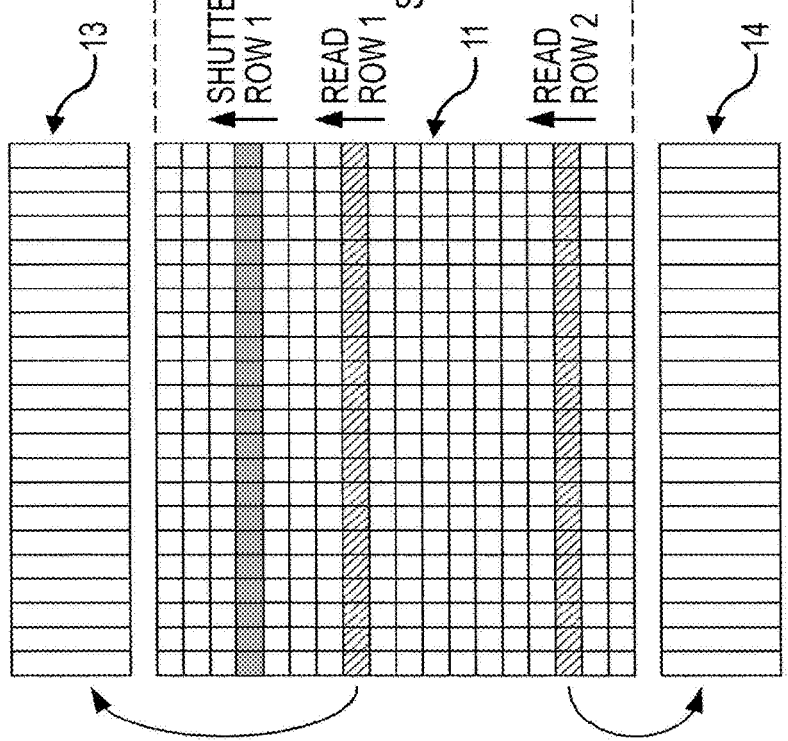
FIG. 3B
FIG. 3A

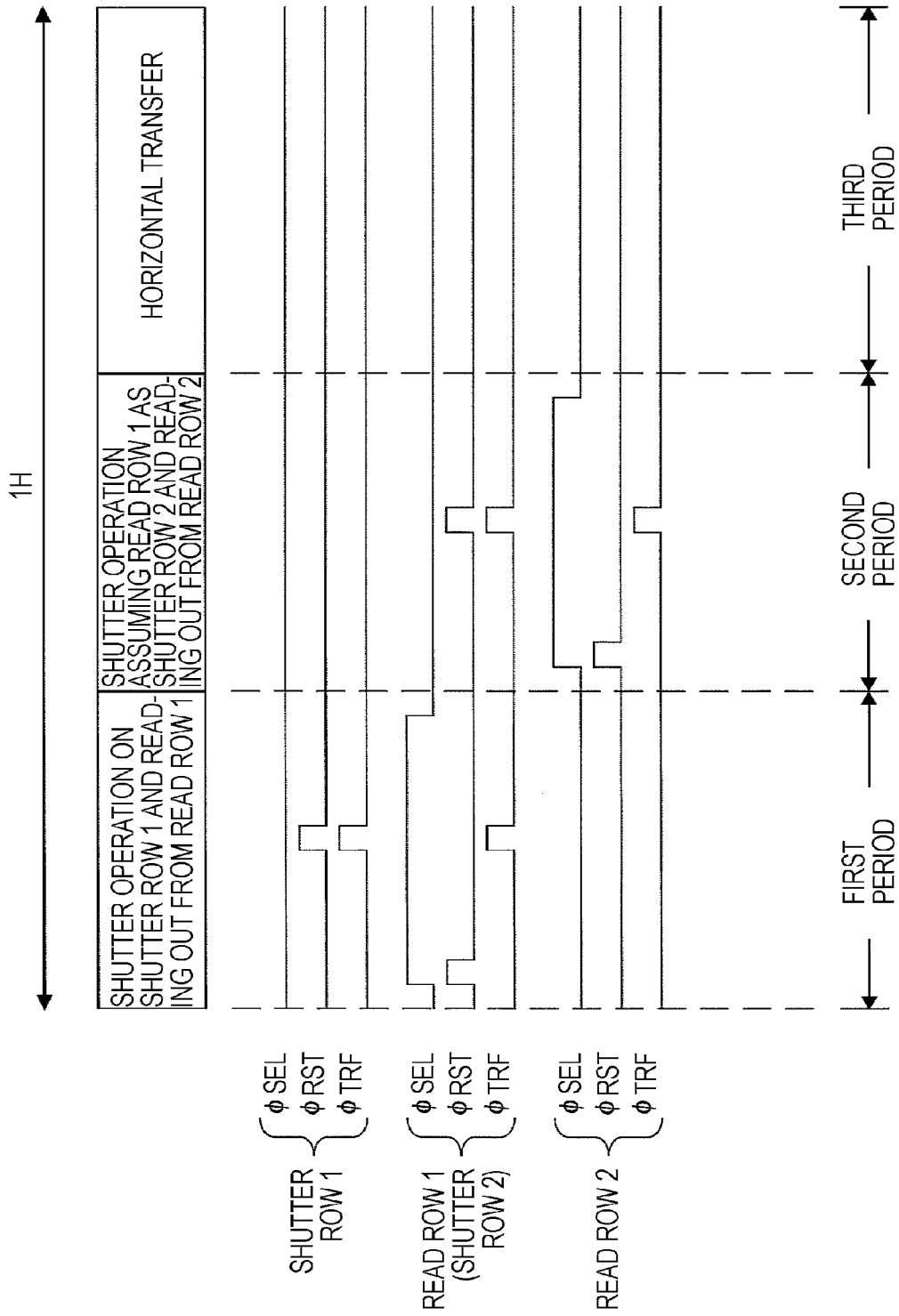

PHYSICAL QUANTITY DETECTING DEVICE, SOLID-STATE IMAGING DEVICE, AND IMAGING APPARATUS

RELATED APPLICATION DATA

This application is a division of U.S. patent application Ser. No. 11/844,499, filed Aug. 24, 2007, the entirety of which is incorporated herein by reference to the extent permitted by law. This application claims the benefit of priority to Japanese Patent Application No. JP 2006-234825 filed in the Japanese Patent Office on Aug. 31, 2006 and Japanese Patent Application JP 2007-028747 filed in the Japanese Patent Office on Feb. 8, 2007, the entirety both of which are incorporated herein by reference to the extent permitted by law.

BACKGROUND OF THE INVENTION

1. Field of the Invention

The present invention relates to a physical quantity detecting device for detecting a physical quantity supplied from the outside, to a solid-state imaging device for detecting light supplied from the outside, and to an imaging apparatus employing the solid-state imaging device.

2. Description of the Related Art

For example, a solid-state imaging device for detecting the intensity of incident light coming through a subject as a physical quantity or a particle detecting device for detecting particles and generating electric signals having the level corresponding to the number of particles received for a predetermined period has known as a physical quantity detecting device for detecting a physical quantity supplied from the outside.

For example, a metal oxide semiconductor (MOS) solid-state imaging device, which is a kind of such a physical quantity detecting device, has a pixel array where pixels including photoelectric converters are two-dimensionally arranged in a matrix and a vertical signal line is provided for each pixel column in this pixel matrix. Techniques for allowing extension of the dynamic range in such a MOS solid-state imaging device by changing the storage time (i.e., the exposure time) of each of the pixels in the pixel array to obtain a high-sensitivity signal and a low-sensitivity signal depending on the length of the storage time, and then by combining the high-sensitivity signal and the low-sensitivity signal are widely known.

The following configuration is known as one of such known techniques (see, for example, "Wide Intrascene Dynamic Range CMOS APS Using Dual Sampling" written by Orly Yadid-Pecht and Eric R. Fossum, IEEE TRANSACTIONS ON ELECTRON DEVICES, VOL. 44, NO. 10, pp. 1721-1723, OCTOBER, 1997). Two column circuits for performing predetermined processing on pixel signals output through a signal line are arranged for each pixel column in the pixel array. A high-sensitivity signal and a low-sensitivity signal that are output from one pixel through one signal line are processed in parallel by the two column circuits.

A concept of this known technique will be described using FIGS. 18A and 18B. FIGS. 18A and 18B illustrate a physical arrangement of a pixel array 101 and two column circuit groups 102 and 103, and a concept of scanning of the pixel array 101, respectively. For simplification of the drawings, the pixel array 101 is shown as a pixel array of 18 rows by 22 columns, herein. In the column circuit groups 102 and 103, a column circuit is arranged for each pixel column.

The pixel array 101 is scanned on a row-by-row basis. Additionally, types of scanning include electronic shutter scanning performed for resetting (removing) signal charges stored in photoelectric converters included in pixels and read-out scanning performed for reading out signals stored in the photoelectric converters. Furthermore, the readout scanning is performed twice regarding each row with different storage times.

A time from scanning of a pixel row on which the electronic shutter scanning is performed (hereinafter, referred to as a "shutter row") to scanning of the shatter row as a pixel row on which first readout scanning is performed (hereinafter, referred to as a "read row 1") corresponds to a storage time 1. Similarly, a time from scanning of the read row 1 to scanning of the read row 1 as a pixel row on which second readout scanning is performed (hereinafter, referred as a "read row 2") corresponds to a storage time 2. By changing lengths of these storage times 1 and 2, two signals with different sensitivities, namely, a low-sensitivity signal and a high-sensitivity signal, can be obtained.

Referring back to FIGS. 18A and 18B, the storage time 1 is equivalent to a time taken for scanning four rows (4H), whereas the storage time 2 is equivalent to a time taken for scanning eight rows (8H). Thus, a signal, which has sensitivity twice as high as a signal from the corresponding pixel in the read row 1, is obtained from each pixel of the read row 2. The two signals having different sensitivities from the corresponding pixel in the identical row are combined by a signal processing circuit (not shown) provided at a subsequent stage, whereby an image signal with a wide dynamic range can be obtained.

Suppose that a time actually taken for a row scanned as an electronic shutter row or a read row to be switched to another row in the vertical direction of the pixel array 101 is set as a unit of time of scanning (hereinafter, referred to as "1H period"). As shown in FIG. 19A, a shutter operation (an electronic shutter operation) on a shutter row, a readout operation of signals from a read row 1 to the column circuit group 102, a readout operation of signals from a read row 2 to the column circuit group 103, and horizontal transfer of the signals read into each of the column circuit groups 102 and 103 are sequentially performed during 1H period. In the case where the column circuit groups 102 and 103 employ pipeline column circuits, signals are immediately transferred to a subsequent stage after being read into the column circuits, and horizontal transfer of the read signals is performed during the next 1H period. Thus, as shown in FIG. 19B, when pipeline column circuits are employed, a shutter operation on a shutter row, a readout operation from a read row 1, and a readout operation from a read row 2 are sequentially performed during 1H period, in parallel to which horizontal transfer of signals (data) from the previous row is also performed.

SUMMARY OF THE INVENTION

A storage time of signals in solid-state imaging devices is generally measured by 1H period, namely, a unit of time of scanning, as one unit. Accordingly, in the above-described known technique, a storage time 1 and a storage time 2 are equivalent to 4H periods and 8H periods, respectively. In the case where a dynamic range is extended by combining a plurality of signals obtained with different storage times, the storage times can be adjusted between the plurality of signals by, for example, doubling values of the signals read out during the shorter storage time 1 so that the doubled values correspond to those of signals read out during the longer storage time 2 if a ratio of the storage time 1 to the storage time 2 is set to an integral multiple.

However, as shown in FIG. 19A, regarding timings of operations performed during 1H period, a lag 1 is caused between a shutter operation on a shutter row and a readout operation from a read row 1. Likewise, a lag 2 is also caused between the readout operation from the read row 1 and a readout operation from a read row 2. For this reason, even if an interval of rows from the shutter row to the read row 1 is set to four, the storage time 1 until reading of signals from the read row 1 is not exactly equal to 4H. Strictly speaking, the storage time 1 is equal to a sum of 4H and the lag 1. In addition, since storage of signals (photoelectrons) starts immediately after reading of signals from the read row 1, the storage time 2 until reading out of signals from the read row 2 is not exactly equal to 8H even if an interval of rows from the read row 1 to the read row 2 is set to eight. Strictly speaking, the storage time 2 is equal to a sum of 8H and the lag 2.

Accordingly, a ratio of the lag 1 to the lag 2 needs to be set equal to 1:2 in order to set the ratio of the storage time 1 to the storage time 2 equal to 1:2. However, to actually realize this ratio, timings are heavily restricted and it becomes more difficult to variously change an interval between the read row 1 and the read row 2 depending on exposure conditions. In addition, when a period for horizontal transfer is long and occupies the most of 1H period, which is common in related arts, the percentage of the lags in 1H period becomes relatively low. However, errors resulting from the lags definitely exist. Since 1H period becomes shorter when pipeline column circuits are employed, which is expected to increase in the feature, the percentage of the lags in 1H period increases. In addition, accuracy of the ratio of the storage times in each of the read rows is extremely important in a method for scanning a plurality of sets of read rows with different storage times as described above. Without an accurate ratio, processing for extending the dynamic range may not be performed accurately or a calculation amount undesirably increases.

Embodiments of the present invention are to overcome the above-described disadvantages. It is desirable to provide a physical quantity detecting device, a solid-state imaging device, and an imaging apparatus capable of accurately setting a ratio of storage times of each of the row sets to an integral multiple in the case of scanning a plurality of sets of read rows while changing signal storage times.

A physical quantity detecting device according to an embodiment of the present invention includes a pixel array in which pixels each for converting a physical quantity supplied from the outside into an electric signal and storing the electric signal are two-dimensionally arranged in a matrix, and scanning means for scanning a plurality of sets of read rows so that a storage time for each of the electric signals differs from one another and for performing a shutter operation on a shutter row in synchronization with a readout operation performed on the corresponding set of read rows out of the plurality of sets of read rows during 1H period that is a unit of time of scanning. The readout operation for reading out the electric signal stored in each of the pixels in the pixel array is performed on the read row. Electronic shutter scanning for resetting the electric signal stored in each of the pixels is performed on the shutter row.

In addition, a solid-state imaging device according to another embodiment of the present invention includes a pixel array in which pixels each for converting light supplied from the outside into an electric signal and storing the electric signal are two-dimensionally arranged in a matrix, and scanning means for scanning a plurality of sets of read rows so that a storage time for each of the electric signals differs from one another and for performing a shutter operation on a shutter row in synchronization with a readout operation performed on the corresponding set of read rows out of the plurality of sets of read rows during 1H period that is a unit of time of scanning. The readout operation for reading out the electric signal stored in each of the pixels in the pixel array is performed on the read row. Electronic shutter scanning for resetting the electric signal stored in each of the pixels is performed on the shutter row.

Furthermore, an imaging apparatus according to still another embodiment of the present invention employs a solid-state imaging device having the above-described configuration as an imaging device.

In the physical quantity detecting device, the solid-state imaging device, and the imaging apparatus according to the embodiments of the present invention, when a plurality of sets of read rows are scanned while changing the storage times of the signals, the readout operation of the corresponding read row and the shutter operation on the shutter row are synchronously performed during 1H period, which is a unit of time of scanning. By this configuration, the ratio of the storage times of each of the sets can be accurately set to an integral multiple.

According to the embodiments of the present invention, the ratio of the storage times of each of the sets can be accurately set to an integral multiple (preferably, a power of two) when a plurality of sets of read rows are scanned while changing the storage times of the signals. Accordingly, dynamic range extending processing can be accurately performed with a small amount of calculation.

BRIEF DESCRIPTION OF THE DRAWINGS

FIGS. 3A and 3B are diagrams illustrating a first scanning method applicable to scanning of pixel rows using a solid-state imaging device according to a first embodiment of the present invention;

FIG. 4 is a timing chart illustrating operations performed during 1H period in a solid-state imaging device according to a first embodiment of the present invention;

DESCRIPTION OF THE PREFERRED EMBODIMENTS

Specific embodiments of the present invention will be described in detail below with reference to the drawings.

Herein, description will be given for, for example, a solid-state imaging device for detecting the intensity of incident light coming through a subject, which is a kind of a physical quantity detecting device for detecting a physical quantity supplied from the outside. In addition, in embodiments of the present invention, description will be given for, for example, a complementary metal oxide semiconductor (CMOS) image sensor, which is a kind of a solid-state imaging device.

[Device Configuration According to First Embodiment]

Figure 1:
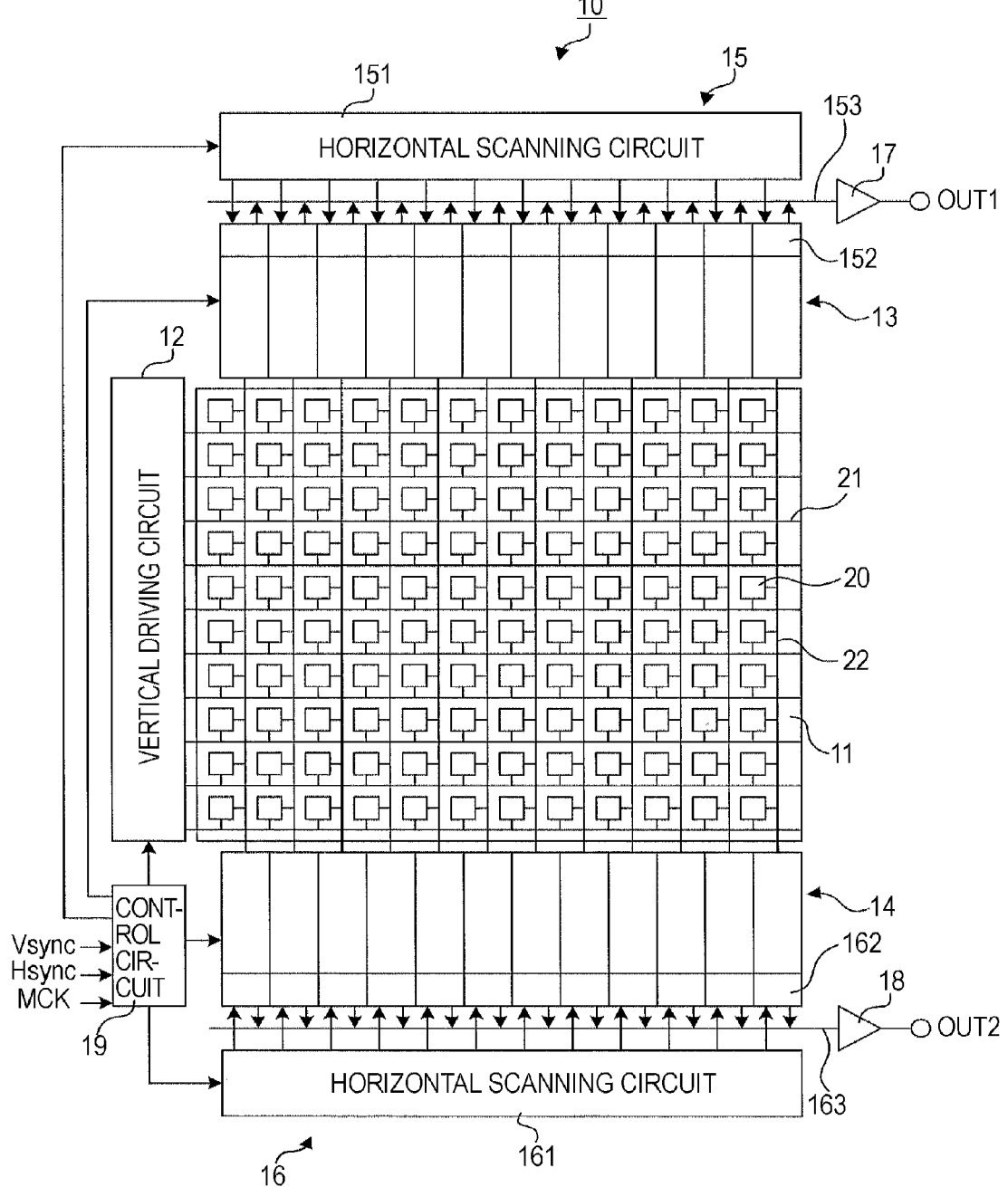
FIG. 1 is a system configuration diagram showing an overview of an exemplary configuration of a solid-state imaging device according to a first embodiment of the present invention.

FIG. 1 is a system configuration diagram showing an overview of an exemplary configuration of a solid-state imaging device according to a first embodiment of the present invention. An illustrated solid-state imaging device 10 includes a pixel array 11, a vertical driving circuit (a scanning unit) 12, column circuit groups 13 and 14, horizontal driving circuits 15 and 16, output circuits 17 and 18, and a control circuit 19. In the pixel array 11, a plurality of pixels for outputting signals representing a physical quantity supplied from the outside, e.g., a plurality of pixels 20 each including a photoelectric converter for generating and storing electric signals (quantities of electric charges) corresponding to an amount of the incident light, are two-dimensionally arranged in a matrix.

In this system configuration, the control circuit 19 receives data for instructing an operational mode of the solid-state imaging device 10 and for other instructions from the outside through an interface (not shown). The control circuit 19 also outputs data including information regarding the solid-state imaging device 10 to the outside. In addition, the control circuit 19 generates a clock signal, a control signal, and other signals on the basis of a vertical synchronization signal Vsync, a horizontal synchronization signal Hsync, and a master clock MCK, and supplies the generated signals to the vertical driving circuit 12, the column circuit groups 13 and 14, and the horizontal driving circuits 15 and 16. The vertical driving circuit 12, the column circuit groups 13 and 14, and the horizontal driving circuits 15 and 16, in turn, operate on the basis of the supplied signals.

In the pixel array 11, the pixels 20 are arranged in a matrix. A pixel driving wiring line 21 is provided for each pixel row of the pixel matrix in the horizontal direction (the left-right direction) in the figure, whereas a vertical signal line 22 is provided for each pixel column in the vertical direction (the top-bottom direction).

[Circuit Configuration of Pixel]

Figure 2:
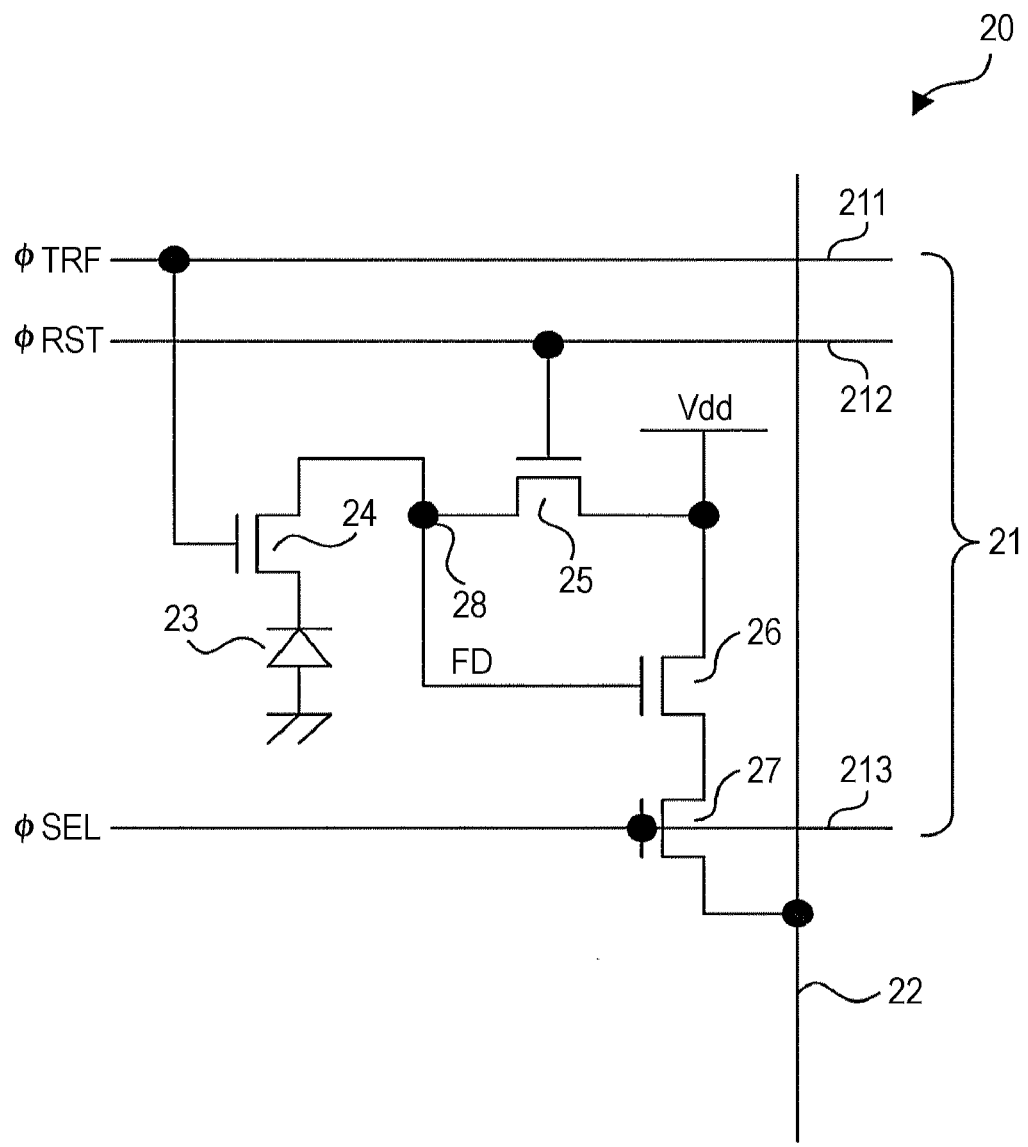
FIG. 2 is a circuit diagram showing an example of a circuit configuration of a pixel.

FIG. 2 is a circuit diagram showing an example of a circuit configuration of the pixel 20. The pixel 20 according to this exemplary circuit includes a photoelectric converter, such as, for example, a photodiode 23, and four transistors, namely, for example, a transfer transistor 24, a reset transistor 25, an amplifying transistor 26, and a selecting transistor 27. In this embodiment, for example, N-channel MOS transistors are used as these transistors 24 to 27. A transfer wiring line 211, a reset wiring line 212, and a selection wiring line 213 are commonly provided for each row of pixels 20 as the pixel driving wiring line 21.

The photodiode 23 converts the incident light into a photocharge (in this embodiment, an electron) corresponding to the amount of the incident light. A cathode of the photodiode 23 is electrically connected to a gate of the amplifying transistor 26 through the transfer transistor 24. A node electrically connected to the gate of the amplifying transistor 26 is called a floating diffusion (FD) portion 28. The FD portion 28 converts the electric charge into voltage.

The transfer transistor 24 is connected between the cathode of the photodiode 23 and the FD portion 28, and is turned on when a transfer pulse $\phi$TRF is supplied to the gate thereof through the transfer wiring line 211, which causes the photocharge that has been subjected to photoelectric conversion by the photodiode 23 and then stored in the photodiode 23 to be transferred to the FD portion 28.

The reset transistor 25 has a drain connected to a power line Vdd and a source connected to the FD portion 28. When a reset pulse $\phi$RST is supplied to the gate of the reset transistor 25 through the reset wiring line 212, the reset transistor 25 is turned on, which causes the electric charge of the FD portion 28 to be transferred to the power line Vdd prior to the transfer of the signal charge from the photodiode 23 to the FD portion 28, thereby resetting the FD portion 28.

The amplifying transistor 26 has a gate connected to the FD portion 28 and a drain connected to the power line Vdd. The amplifying transistor 26 outputs the potential of the FD portion 28 reset by the reset transistor 25 as a reset level and also outputs, as a signal level, the potential of the FD portion 28 after the signal charge is transferred from the photodiode 23 by the transfer transistor 24.

For example, the selecting transistor 27 has a drain connected to the source of the amplifying transistor 26 and a source connected to the vertical signal line 22. The selecting transistor 27 is turned on when a selection pulse $\phi$SEL is supplied to the gate thereof through the selection wiring line 213, which causes the pixel 20 to be selected. As a result, the signal output from the amplifying transistor 26 is transferred to the vertical signal line 22.

The selecting transistor 27 may be connected between the power line Vdd and the drain of the amplifying transistor 26.

In addition, the pixel 20 has the four transistors, but the invention is not limited this configuration. For example, the pixel 20 may have three transistors including a transistor serving as both the amplifying transistor 26 and the selecting transistor 27.

Referring back to FIG. 1, the vertical driving circuit 12 is constituted by shift registers or a decoder. The vertical driving circuit 12 sequentially and selectively scans rows of pixels 20 in the pixel array 11, and supplies a necessary driving pulse (a control pulse) to each pixel in the selected row through the pixel driving wiring line 21.

In this embodiment, although not shown in the drawings, the vertical driving circuit 12 includes a readout scanning system for performing a readout operation of sequentially selecting rows of pixels 20 and reading out signals of pixels 20 in the selected row and an electronic shutter scanning system for performing an electronic shutter operation for removing (resetting) the signal charge having been stored in the photodiodes 23 of the pixels 20 in the same row at a time corresponding to a shutter speed before the readout operation performed by the readout scanning system.

Generally, a period from reset of an unnecessary signal charge of the photodiode 23 through the shutter operation performed by the electronic shutter scanning system to readout of signals of the pixel 20 through the readout operation by the readout scanning system corresponds to the storage time (the exposure time) of a signal charge in the pixel 20. That is, the electronic shutter operation means an operation of resetting the signal charge stored in the photodiode 23 and newly starting to store a signal charge. The scanning methods according to embodiments of the present invention are realized by the selective scanning performed by the vertical driving circuit 12.

The signals output from each of the pixels 20 in the selected row are supplied to the column circuit group 13 or 14 through each vertical signal line 22. The column circuit groups 13 and 14 have column circuits provided above and below the pixel array 11 so as to have a one-to-one correspondence with columns of pixels in the pixel array 11, respectively. The column circuit group 13 or 14 receives the signals output from each pixel 20 in one row and performs signal processing, such as amplification or correlated double sampling (CDS), on the received signals to remove a fixed pattern noise specific to the pixels. Each of the column circuits of the column circuit groups 13 and 14 may also have an A/D (analog-to-digital) converting function.

The horizontal driving circuits 15 and 16 are provided as so to correspond to the column circuit groups 13 and 14, respectively. The horizontal driving circuit 15 includes a horizontal scanning circuit 151, a horizontal selecting switch group 152, and a horizontal signal line 153. The horizontal scanning circuit 151 is constituted by shift registers. The horizontal scanning circuit 151 sequentially selects switches of the horizontal selecting switch group 152, thereby causing the signals corresponding to one row of pixels that have been processed by the column circuits of the column circuit group 13 to be sequentially output to the horizontal signal line 153.

Similar to the horizontal driving circuit 15, the horizontal driving circuit 16 also includes a horizontal scanning circuit 161, a horizontal selecting switch group 162, and a horizontal signal line 163. The horizontal scanning circuit 161 sequentially selects switches of the horizontal selecting switch group 162 by horizontal scanning, thereby causing the signals corresponding to one row of pixels that have been processed by the column circuits of the column circuit group 14 to be sequentially output to the horizontal signal line 163.

The output circuits 17 and 18 perform various signal processing operations on the signals sequentially supplied from each column circuit of the column circuit groups 13 and 14 through the horizontal selecting switch groups 152 and 162 and the horizontal signal lines 153 and 163, respectively, and output the processed signals as output signals OUT1 and OUT2, respectively. The output circuits 17 and 18 may perform only a buffering operation, or it may perform, for example, an operation of adjusting a black level, an operation of correcting the deviation between columns of pixels, an operation of amplifying signals, and an operation related to colors before buffering.

[First Scanning Method According to First Embodiment]

FIGS. 3A and 3B illustrate a first scanning method applicable to scanning of pixel rows using the solid-state imaging device 10 according to the first embodiment of the present invention. More specifically, FIGS. 3A and 3B illustrate a physical arrangement of the pixel array 11 and the two column circuit groups 13 and 14, and a concept of scanning of the pixel array 11, respectively. In this embodiment, a time taken for the vertical driving circuit 12 to scan one row in the vertical direction of the pixel array 11 is defined as a unit of time of scanning, namely, "1H period".

As illustrated, one shutter row (one set) and two read rows (two sets) are scanned in the first scanning method according to the first embodiment of the present invention. The vertical driving circuit 12 selectively scans the pixel array on a row-by-row basis from the bottom to the top in the vertical direction as shown by arrows in the figures. Intervals of rows from a row of pixels on which electronic shutter scanning is performed (hereinafter, referred to as a "shutter row 1") to two rows of pixels on each of which readout scanning is performed are set in the following manner. The interval from the shutter row 1 to the row of pixels, on the downstream side (previous stage side) of the scanning direction, on which the readout scanning is performed (hereinafter, referred to as a "read row 1") is set to four. On the other hand, the interval from the read row 1 to the row of pixels, on the upstream side (subsequent stage side) of the scanning direction, on which the readout scanning is performed (hereinafter, referred to as a "readout row 2") is set to eight.

In addition, the interval from the shutter row 1 to the read row 1 corresponds to a storage time (exposure time) 1 of signal charges. Likewise, the interval from the read row 1 to the read row 2 corresponds to a storage time (exposure time) 2 of signal charges. Since the interval between the shutter row 1 and the read row 1 is four rows, the storage time 1 is equal to a time equivalent to 4H periods. Similarly, since the interval between the read row 1 and the read row 2 is eight rows, the storage time 2 is equal to a time equivalent to 8H periods.

By changing the storage times, such as the storage times 1 and 2 corresponding to 4H and 8H, respectively, the sensitivity of the signals read out from pixels in the read row 1 becomes relatively low, while the sensitivity of the signals read out from pixels in the read row 2 becomes relatively high. Since a ratio of the storage time 1 to the storage time 2 is set to be an integral multiple (1:2), a signal having the sensitivity twice as high as that of a signal from the read row 1 is output from the read row 2. In this way, two signals (i.e., a high-sensitivity signal and a low-sensitivity signal) with different sensitivities (storage times) can be obtained for each of the pixels 20 in the pixel array 11. Thus, by combing these two signals by a signal processing circuit (not shown) provided at a subsequent stage, an image signal with a wide dynamic range can be obtained.

FIG. 4 is a timing chart illustrating operations performed during 1H period in the solid-state imaging device 10 according to the first embodiment of the present invention. The 1H period can be divided mainly into three (i.e., a first period, a second period, and a third period). During the first period, a shutter operation on the shutter row 1 is performed in synchronization with a readout operation from the read row 1 corresponding to the shutter row 1. During the second period, a shutter operation on the read row 1, which is assumed as a shutter row 2, is performed in synchronization with a readout operation from the read row 2 corresponding to the shutter row 2. During the third period, the horizontal driving circuits 15 and 16 perform horizontal transfer of signals.

[Details of First Period]

On the read row 1, the selection pulse φSEL is caused to rise (to be the high level) so as to turn on the selecting transistor 27, and the reset pulse φRST is caused to rise so as to turn on the reset transistor 25, thereby resetting the FD portion 28. A potential (a reset level) of the FD portion 28 after the reset caused by the reset pulse φRST is supplied to the column circuit of the column circuit group 13 through the vertical signal line 22.

Then, on the read row 1, the transfer pulse φTRF is caused to rise so as to turn on the transfer transistor 24, thereby transferring photoelectrons stored in the photodiode 23 to the FD portion 28. A potential (a signal level) of the FD portion 28 after the transfer caused by the transfer pulse φTRF is supplied to the column circuit of the column circuit group 13 through the vertical signal line 22. The column circuit of the column circuit group 13 calculates the difference between the reset level and the signal level, and advances the process to the next step.

On the other hand, on the shutter row 1, the reset transistor 25 and the transfer transistor 24 are simultaneously turned on by causing the reset pulse φRST and the transfer pulse φTRF to rise in synchronization with the transfer pulse φTRF of the read row 1 while keeping the selecting transistor 27 turned off (while keeping the selection pulse φSEL at the low level), thereby resetting the photodiode 23.

[Details of Second Period]

On the read row 2, the selection pulse φSEL is caused to rise so as to turn on the selecting transistor 27 and the reset pulse φRST is caused to rise so as to turn on the reset transistor 25, thereby resetting the FD portion 28. Then, the potential (the reset level) of the FD portion 28 after the reset caused by the reset pulse φRST is supplied to the column circuit of the column circuit group 14 through the vertical signal line 22.

Then, on the read row 2, the transfer pulse φTRF is caused to rise so as to turn on the transfer transistor 24, thereby transferring photoelectrons stored in the photodiode 23 to the FD portion 28. The potential (the signal level) of the FD portion 28 after the transfer caused by the transfer pulse φTRF is supplied to the column circuit of the column circuit group 14 through the vertical signal line 22. The column circuit of the column circuit group 14 calculates the difference between the reset level and the signal level, and advances the process to the next step.

On the other hand, the previous read row of the read row 2 is the read row 1. Thus, this read row 1 is used as the shutter row 2 corresponding to the read row 2, and the following shutter operation is performed. More specifically, on the read row 1 (the shutter row 2), the reset transistor 25 and the transfer transistor 24 are simultaneously turned on by causing the reset pulse φRST and the transfer pulse φTRF to rise in synchronization with the transfer pulse φTRF of the read row 2 while keeping the selecting transistor 27 turned off (while keeping the selection pulse φSEL at the low level), thereby resetting the photodiode 23.

The operations performed on the read row 1, the shutter row 1, and the column circuit group 13 during the first period and the operations performed on the read row 2, the read row 1 (the shutter row 2), and the column circuit group 14 during the second period are substantially the same.

[Details of Third Period]

The third period corresponds to a horizontal transfer period for transferring the output of each of the column circuits of the column circuit groups 13 and 14 to the output circuits 17 and 18 through the corresponding horizontal signal lines 153 and 163, respectively. In this embodiment, after the horizontal transfer period, a row scanned by the vertical driving circuit 12 advances to another row. The same operations as described above are repeated on the next row.

In the above-described operations, the timing at which the storage time 1 of the read row 1 ends is decided by the timing of the fall of the transfer pulse φTRF on the read row 1. On the other hand, on the shutter row 1, the transfer pulse φTRF and the reset pulse φRST are caused to fall in synchronization with the fall of the transfer pulse φTRF of the read row 1 corresponding to the shutter row 1, thereby resetting the photodiode 23. By causing each of the transfer pulses φTRF to synchronously fall on the read row 1 and the shutter row 1 during the first period in this way, the storage time 1 of the read row 1 is set exactly equal to 4H.

Likewise, the timing at which the storage time of the read row 2 ends is decided by the timing of the fall of the transfer pulse φTRF on the read row 2. On the other hand, in the shutter operation performed while assuming the read row 1 as the shutter row 2, the transfer pulse φTRF and the reset pulse φRST are caused to fall in synchronization with the fall of the transfer pulse φTRF on the read row 2, thereby resetting the photodiode 23. By causing each of the transfer pulses φTRF to synchronously fall on the read row 2 and the shutter row 2 corresponding to the read row 2 during the second period in this way, the storage time 2 of the read row 2 is set exactly equal to 8H. Accordingly, the ratio of the storage time 1 to the storage time 2 is set exactly to an integral multiple (1:2).

In addition, since the ratio of the storage time 1 of the read row 1 to the storage time 2 of the read row 2 is set to 1:2, namely, a power of two (e.g., 1, 2, 4, 8, 16, . . . ), signal processing (combining processing) performed by an image processing circuit provided at a subsequent stage to extend the dynamic range becomes simpler. More specifically, the storage times can be adjusted by performing a bit-shift operation on a digitalized signal after performing A/D (analog-to-digital) conversion on an analog signal read out from each pixel. For example, in the case where the storage time 1 and the storage time 2 are equal to 4H and 8H, respectively, as described above, the value of the digitalized signal read out during the storage time 1 can be doubled by shifting the value of the digitalized signal by one bit and can be converted into a value corresponding to that of the digital signal read out during the storage time 2. Thus, dynamic range extension processing can be performed accurately with a small amount of calculation.

In related arts, the shutter operation is not performed on the read row 1 corresponding to the shutter row 1 while assuming the read row 1 as the shutter row 2 corresponding to the read row 2. Thus, the storage time of the read row 2 is equivalent to a period from resetting the photodiode 23 by the transfer pulse φTRF of the read row 1 during the first period to reading out of the signal of the photodiode 23 by the transfer pulse φTRF of the read row 2 during the second period after scanning of eight rows. Since this storage time includes time lags of the operations performed during 1H period, the storage time of the read row 2 is not exactly equal to 8H even if the interval from the read row 1 to the read row 2 is set to eight rows. Such an error in time becomes relatively small if the horizontal transfer period (the third period) occupying 1H period is long. However, this error is problematic in high-resolution image sensors.

Figure 5:
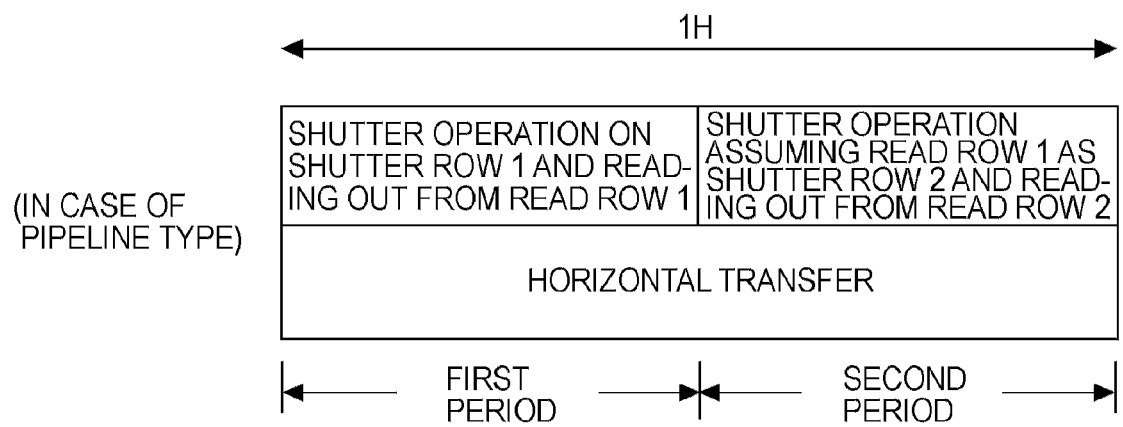
FIG. 5 is a diagram illustrating operations performed during 1H period in the case where pipeline column circuits are employed in a solid-state imaging device according to a first embodiment of the present invention.

In addition, for example, each column circuit of the column circuit groups 13 and 14 may employ a pipeline configuration that allows the acquired signals to be sequentially output to the horizontal driving circuits 15 and 16 while acquiring signals from the vertical signal lines 22 to cope with high-speed processing. In such a case, as shown in FIG. 5, 1H period is divided into the first period (a period during which the shutter operation on the shutter row 1 and the readout operation from the read row 1 are performed) and the second period (a period during which the shutter operation on the read row 1 serving as the shutter row 2 and the readout operation from the read row 2 are performed). During 1H period, reading out of signals from a current row and the horizontal transfer of signals having been read out from the previous row are performed simultaneously. Thus, when the shutter operation is not performed while assuming the read row 1 corresponding to the shutter row 1 as the shutter row 2 corresponding to the read row 2, an effect of the time error increases in 1H period, due to which a problem of the error comes up.

The reset pulse φRST and the transfer pulse φTRF are caused to rise and fall synchronously in the shutter operation performed on the shutter row 1 and in the shutter operation performed on the read row 1 serving as the shutter row 2 in order to certainly reset the photodiode 23 on the shutter rows 1 and 2. In such a case, the potential in the pixels slightly differs from that at the time of reading of signals since the selecting transistor 27 is not turned on. Thus, the photodiode 23 is reset by the transfer pulse φTRF in a slightly different manner. However, use of a buried photodiode capable of performing complete transfer as the photodiode 23 serving as a photoelectric converter allows the photodiode 23 to be reset into a photoelectron-free state without deviations, whereby the image quality can be improved.

In addition, it is reasonable, but not necessary, to provide a transfer pulse φTRF from an identical source to both the shutter row 1 and the read row 1 during the first period and to provide a transfer pulse φTRF from an identical source to both the read row 1 (the shutter row 2) and the read row 2 during the second period.

Furthermore, timings of both the rise and the fall of the transfer pulse φTRF of the shutter line 1 and the transfer pulse φTRF of the read row 1 are not necessarily set identical on the shutter row 1 and the read row 1 during the first period. Since the storage time of signal charges is decided by the timing of the fall, but not the rise, of the transfer pulse φTRF, adjustment of the timings of the fall of the transfer pulses φTRF on the shutter row 1 and the read row 1 is more important.

Accuracy of adjusting the timings of the fall of the transfer pulses φTRF on the shutter row 1 and the read row 1 only have to be kept within a range allowable as a practical error in application of the solid-state imaging device 10. For example, even if the timings differ from one another by ten clock cycles of the master clock MCK, the timing error may not be problematic in a practical use. Similarly, regarding the shutter row 2 and the read row 2 of the second period, timings of both the rise and the fall of the transfer pulse φTRF of the shutter row 2 and the transfer pulse φTRF of the read row 2 are not necessarily set identical. Furthermore, in this embodiment, the description has been given for a case where two column circuits are provided for each pixel column and signals are read from two read rows in parallel. However, the configuration is not limited to this example. When the number of the read rows from which signals are read out in parallel is set to three or more by increasing the number of column circuits provided for each column, the shutter operation may be performed on the read row 2 in synchronization with the read operation from the next read row after performing the read operation on the read row 2 as in the case of the above-described read row 1.

[Second Scanning Method According to First Embodiment]

Figure 6:
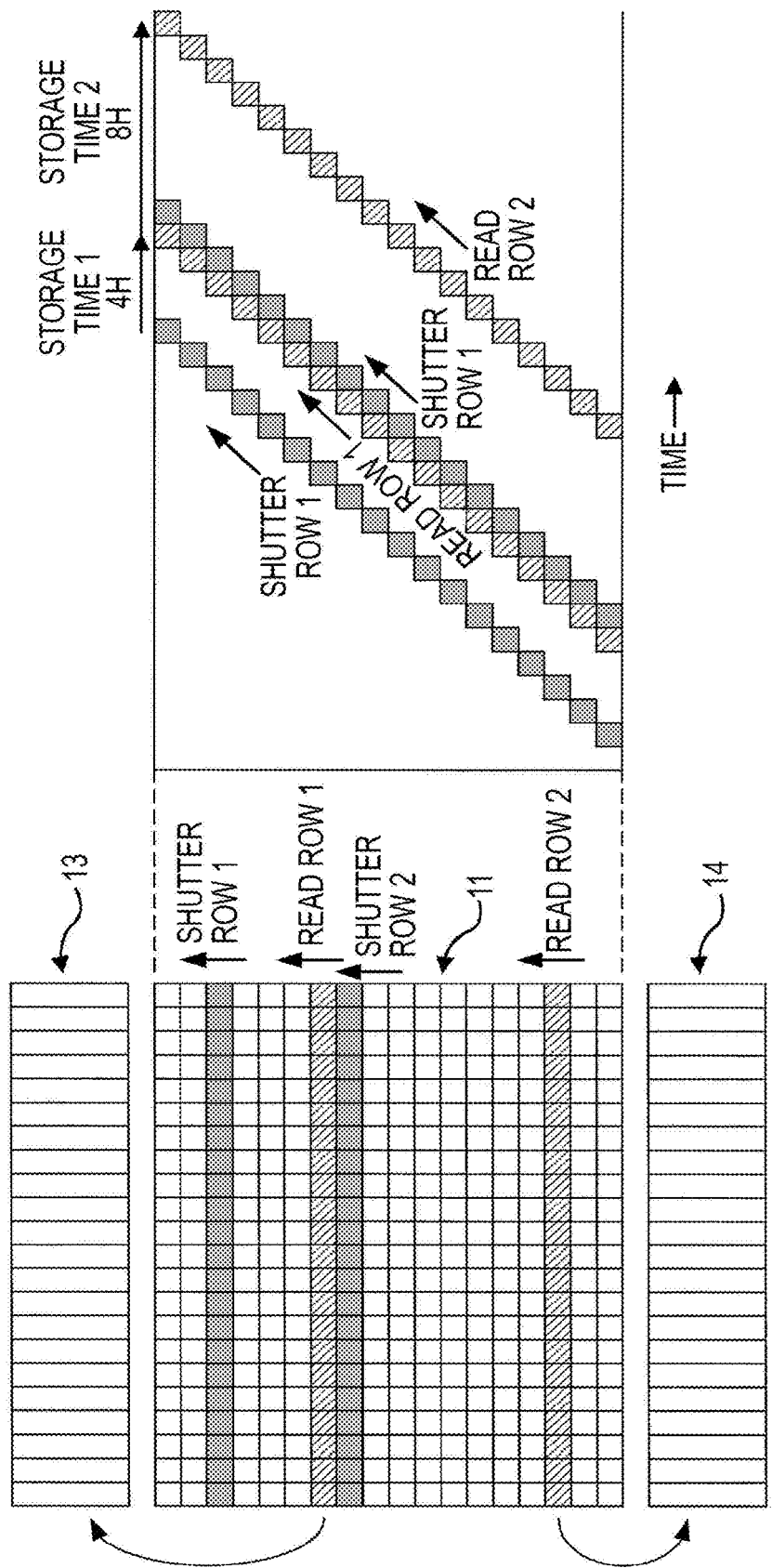
FIGS. 6A and 6B are diagrams illustrating a second scanning method applicable to scanning of pixel rows using a solid-state imaging device according to a first embodiment of the present invention.

FIGS. 6A and 6B illustrate a second scanning method applicable to scanning of pixel rows using the solid-state imaging device 10 according to the first embodiment of the present invention. More specifically, FIGS. 6A and 6B show a physical arrangement of the pixel array 11 and the two column circuit groups 13 and 14, and a concept of scanning of the pixel array 11, respectively.

As illustrated, two (two sets of) shutter rows and two (two sets of) read rows are scanned in the second scanning method according to the first embodiment of the present invention. The vertical driving circuit 12 selectively scans the pixel array on a row-by-row basis from the bottom to the top in the vertical direction as shown by arrows in the figures. The interval of rows from a row of pixels, on the downstream side (previous stage side) in the scanning direction, on which the electronic shutter scanning is performed (hereinafter, referred to as a "shutter row 1") to a row of pixels, also on the downstream side (previous stage side) of the scanning direction, on which the readout scanning is performed (hereinafter, referred to as a "read row 1") is set to four. On the other hand, the interval from a row of pixels, on the upstream side (subsequent stage side) in the scanning direction, on which the electronic shutter scanning is performed (hereinafter, referred to as a "shutter row 2") to a row of pixels, also on the upstream side (subsequent stage side) of the scanning direction, on which the readout scanning is performed (hereinafter, referred to as a "read row 2) is set to eight.

In addition, the next row adjacent to the read row 1 in the vertical direction of the pixel array 11 is the shutter row 2. Accordingly, when a period during which a row selectively scanned by the vertical driving circuit 12 is switched to the next row in the vertical direction of the pixel array 11 is defined as a unit of time of scanning, namely, "1H period", as described above, a pixel row scanned as the read row 1 during 1H period is then treated as the shutter row 2 during the next 1H period. Additionally, the interval from the shutter row 1 to the read row 1 corresponds to a period since a shutter operation (an electronic shutter operation) is performed on one pixel row treated as the shutter row 1 until a readout operation is performed on the pixel row treated as the read row 1, namely, a storage time (exposure time) of signal charges. Likewise, the interval from the shutter row 2 to the read row 2 corresponds to a period since a shutter operation is performed on one pixel row treated as the shutter row 2 until a readout operation is performed on the pixel row treated as the read row 2, namely, a storage time (exposure time) of signal charges. Accordingly, the shutter row 1 and the read row 1 corresponding to this shutter row 1 are referred to as a first set, whereas the shutter row 2 and the read row 2 corresponding to this shutter row 2 is referred to as a second set. Since the interval from the shutter row 1 to the read row 1 is four rows, the storage time 1 of the first set is equivalent to 4H periods. Similarly, since the interval from the shutter row 2 to the read row 2 is eight rows, the storage time 2 of the second set is equivalent to 8H periods.

By changing the storage times, such as the storage times 1 and 2 corresponding to 4H and 8H, respectively, sensitivity of signals read out from pixels in the read row 1 becomes relatively low, while sensitivity of signals read out from pixels in the read row 2 becomes relatively high. Since a ratio of the storage time 1 to the storage time 2 is set to an integral multiple (1:2), a signal having sensitivity twice as high as that of a signal from the read row 1 is output from the read row 2. In this way, two signals (i.e., a high-sensitivity signal and a low-sensitivity signal) with different sensitivities (storage times) can be obtained for each of the pixels 20 in the pixel array 11. Thus, by combing these two signals by a signal processing circuit (not shown) provided at a subsequent stage, an image signal with a wide dynamic range can be obtained.

Figure 7:
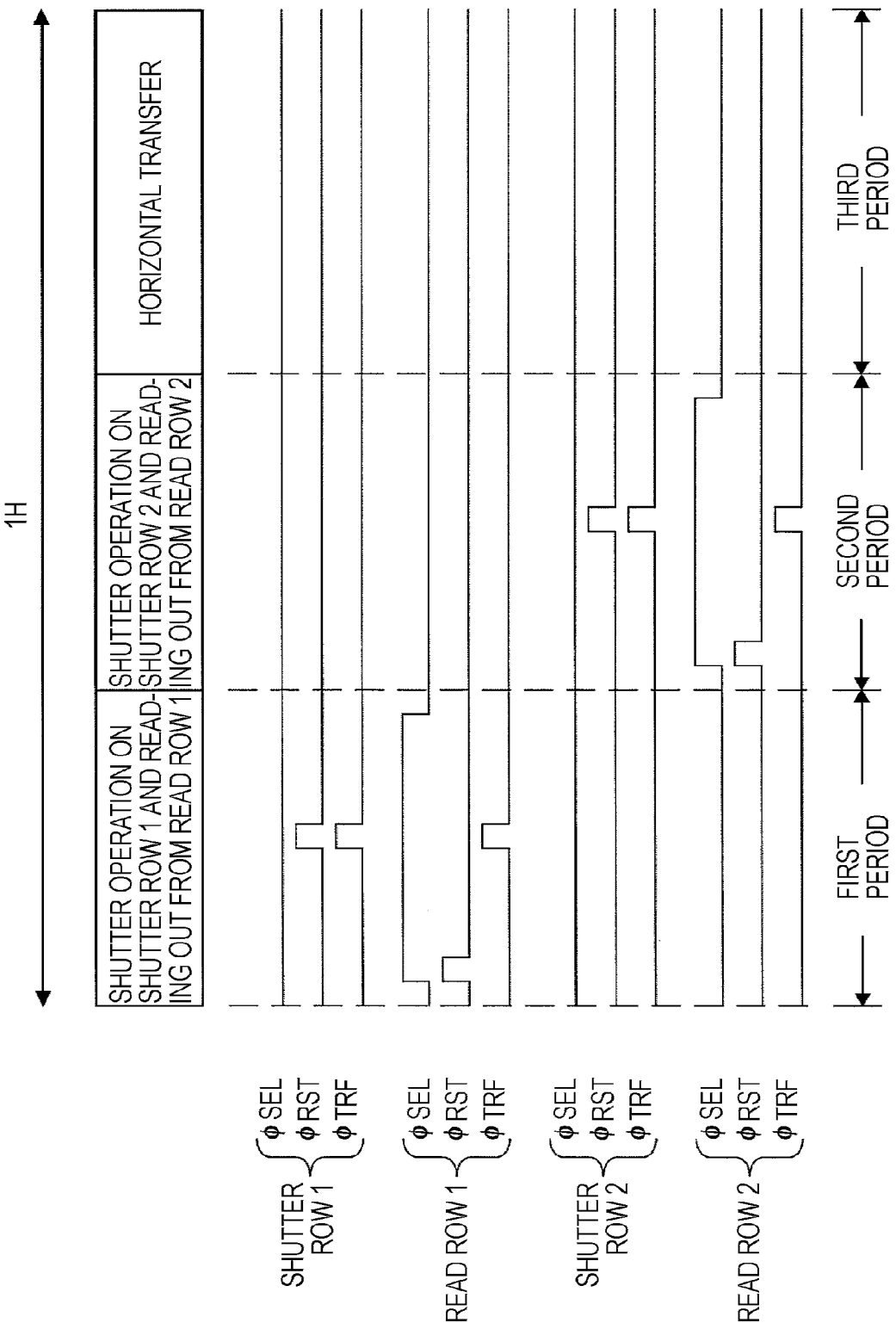
FIG. 7 is a timing chart illustrating operations performed during 1H period in a solid-state imaging device according to a first embodiment of the present invention.

FIG. 7 is a timing chart illustrating operations performed during 1H period in the solid-state imaging device 10 according to the first embodiment of the present invention. 1H period can be divided mainly into three (i.e., a first period, a second period, and a third period). During the first period, a shutter operation on the shutter row 1 is performed in synchronization with a readout operation from the read row 1 corresponding to the shutter row 1. During the second period, a shutter operation on the shutter row 2 is performed in synchronization with a readout operation from the read row 2 corresponding to the shutter row 2. During the third period, the horizontal driving circuits 15 and 16 perform horizontal transfer of signals.

[Details of First Period]

On the read row 1, the selection pulse φSEL is caused to rise (to be at the high level) so as to turn on the selecting transistor 27, and the reset pulse φRST is caused to rise so as to turn on the reset transistor 25, thereby resetting the FD portion 28. A potential (a reset level) of the FD portion 28 after the reset by the reset pulse φRST is supplied to the column circuit of the column circuit group 13 through the vertical signal line 22.

Then, on the read row 1, the transfer pulse φTRF is caused to rise so as to turn on the transfer transistor 24, thereby transferring photoelectrons stored in the photodiode 23 to the FD portion 28. A potential (a signal level) of the FD portion 28 after the transfer by the transfer pulse φTRF is supplied to the column circuit of the column circuit group 13 through the vertical signal line 22. Each column circuit of the column circuit group 13 calculates the difference between the reset level and the signal level, and advances the process to the next step.

On the other hand, on the shutter row 1, the reset transistor 25 and the transfer transistor 24 are simultaneously turned on by causing the reset pulse φRST and the transfer pulse φTRF to rise in synchronization with the transfer pulse φTRF of the read row 1 while keeping the selecting transistor 27 turned off (while keeping the selection pulse φSEL at the low level), thereby resetting the photodiode 23.

[Details of Second Period]

On the read row 2, the selection pulse φSEL is caused to rise so as to turn on the selecting transistor 27, and the reset pulse φRST is caused to rise so as to turn on the reset transistor 25, thereby resetting the FD portion 28. Then, the potential (the reset level) of the FD portion 28 after the reset by the reset pulse φRST is supplied to the column circuit of the column circuit group 14 through the vertical signal line 22.

Then, on the read row 2, the transfer pulse φTRF is caused to rise so as to turn on the transfer transistor 24, thereby transferring photoelectrons stored in the photodiode 23 to the FD portion 28. The potential (the signal level) of the FD portion 28 after the transfer by the transfer pulse φTRF is supplied to the column circuit of the column circuit group 14 through the vertical signal line 22. The column circuit of the column circuit group 14 calculates the difference between the reset level and the signal level, and advances the process to the next step.

On the other hand, on the shutter row 2, the reset transistor 25 and the transfer transistor 24 are simultaneously turned on by causing the reset pulse φRST and the transfer pulse φTRF to rise in synchronization with the transfer pulse φTRF of the read row 2 while keeping the selecting transistor 27 turned off (while keeping the selection pulse φSEL at the low level), thereby resetting the photodiode 23.

The operations performed on the read row 1, the shutter row 1, and the column circuit group 13 during the first period and the operations performed on the read row 2, the shutter row 2, and the column circuit group 14 during the second period are substantially the same.

[Details of Third Period]

The third period corresponds to a horizontal transfer period for transferring the output of each of the column circuits of the column circuit groups 13 and 14 to the output circuits 17 and 18 through the corresponding horizontal signal lines 153 and 163, respectively. In this embodiment, after the horizontal transfer period, a row scanned by the vertical driving circuit 12 advances to another row. The same operations as those described above are repeated on the next row.

In the above-described operations, the timing at which the storage time 1 of the read row 1 ends is decided by the timing of the fall of the transfer pulse φTRF on the read row 1. On the other hand, on the shutter row 1, the transfer pulse φTRF and the reset pulse φRST are caused to fall in synchronization with the fall of the transfer pulse φTRF of the read row 1, thereby resetting the photodiode 23. By causing each of the transfer pulses φTRF to synchronously fall on the read row 1 and the shutter row 1 during the first period in this way, the storage time 1 of the read row 1 of the first set is exactly equal to 4H.

Likewise, the timing at which the storage time of the read row 2 ends is decided by the timing of the fall of the transfer pulse φTRF on the read row 2. On the other hand, on the shutter row 2, the transfer pulse φTRF and the reset pulse φRST are caused to fall in synchronization with the fall of the transfer pulse φTRF of the read row 2, thereby resetting the photodiode 23. By causing each of the transfer pulses φTRF to synchronously fall on the read row 2 and the shutter row 2 during the second period in this way, the storage time 2 of the read row 2 of the second set is exactly equal to 8H. Accordingly, the ratio of the storage time 1 to the storage time 2 is set exactly to an integral multiple (1:2).

In addition, since the ratio of the storage time 1 of the read row 1 to the storage time 2 of the read row 2 is set to 1:2, namely, a power of two (e.g., 1, 2, 4, 8, 16, . . . ), signal processing (combining processing) performed by an image processing circuit provided at a subsequent stage to extend the dynamic range becomes simpler.

Meanwhile, in related arts, the shutter row 2 is not used. Thus, the storage time of the read row 2 is equivalent to a period from resetting the photodiode 23 by the transfer pulse φTRF of the read row 1 to reading out of the signal of the photodiode 23 by the transfer pulse φTRF of the read row 2 after scanning eight rows. Since this storage time includes time lags of the operations performed during 1H period, the storage time of the read row 2 is not exactly equal to 8H even if the interval from the read row 1 to the read row 2 is set to eight rows. Such an error in time becomes relatively small if the horizontal transfer period (the third period) occupying 1H period is long. However, this error is problematic in high-resolution image sensors.

Figure 8:
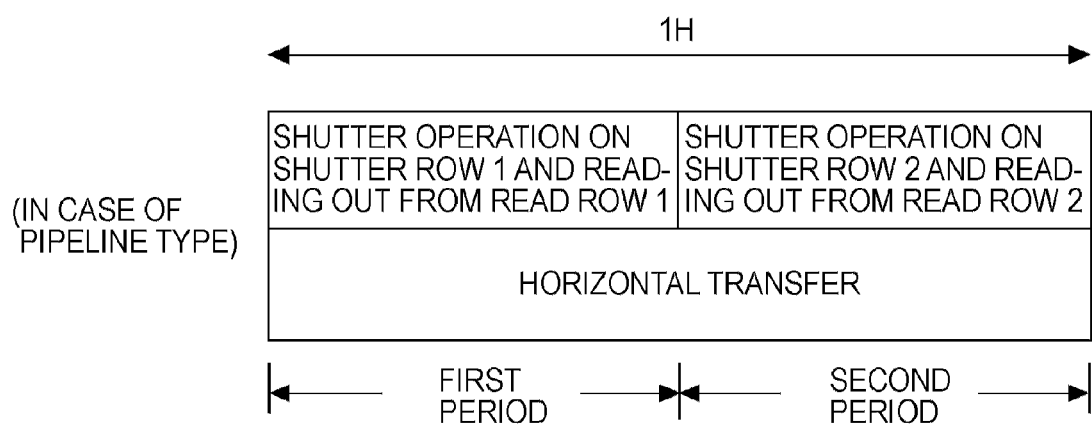
FIG. 8 is a diagram illustrating operations performed during 1H period in the case where pipeline column circuits are employed in a solid-state imaging device according to a first embodiment of the present invention.

In addition, for example, each column circuit of the column circuit groups 13 and 14 may employ a pipeline configuration that allows the acquired signals to be sequentially output to the horizontal driving circuit 15 and 16 while acquiring signals from the vertical signal lines 22 to cope with high-speed processing. In such a case, as shown in FIG. 8, 1H period is divided into the first period (a period during which the shutter operation on the shutter row 1 and the readout operation from the read row 1 are performed) and the second period (a period during which the shutter operation on the shutter row 2 and the readout operation from the read row 2 are performed). During 1H period, reading out of signals from a current row and the horizontal transfer of signals having been read out from the previous row are performed simultaneously. Thus, without the shutter row 2, an effect of the time error increases in 1H period, due to which a problem of the time lags comes up.

The reset pulse φRST and the transfer pulse φTRF are caused to rise and fall synchronously on the shutter row 1 and on the shutter row 2 in order to certainly reset the photodiode 23. In such a case, the potential in the pixels slightly differs from that at the time of reading of signals since the selecting transistor 27 is not turned on. Thus, the photodiode 23 is reset by the transfer pulse φTRF in a slightly different manner. However, use of a buried photodiode capable of performing complete transfer as the photodiode 23 serving as a photoelectric converter allows the photodiode 23 to be reset into a photoelectron-free state without deviations, whereby the image quality can be improved.

In addition, the shutter row 2 is arranged next to the read row 1 in order not to waste the storage time. In the case where high sensitivity is not required, the shutter row 2 may be set at a row behind the read row 1 by two or more rows.

In addition, it is reasonable, but not necessary, to provide a transfer pulse φTRF from an identical source to both the shutter row 1 and the read row 1 and to provide a transfer pulse φTRF from an identical source to both the shutter row 2 and the read row 2.

Furthermore, timings of both the rise and the fall of the transfer pulse φTRF of the shutter row 1 and the transfer pulse φTRF of the read row 1 are not necessarily set identical on the shutter row 1 and the read row 1. Since the storage time of signal charges is decided by the timing of the fall, but not the rise, of the transfer pulse φTRF, adjustment of the timings of the fall of the transfer pulses φTRF on the shutter row 1 and the read row 1 is more important.

In addition, accuracy of adjusting the timings of the fall of the transfer pulses φTRF on the shutter row 1 and the read row 1 only have to be kept within a range allowable as a practical error in application of the solid-state imaging device 10. For example, even if the timings differ from one another by ten clock cycles of the master clock MCK, the timing error may not be problematic in a practical use. Similarly, regarding the shutter row 2 and the read row 2, timings of both the rise and the fall of the transfer pulse φTRF of the shutter row 2 and the transfer pulse φTRF of the read row 2 are not necessarily set identical.

[Device Configuration According to Second Embodiment]

Figure 9:
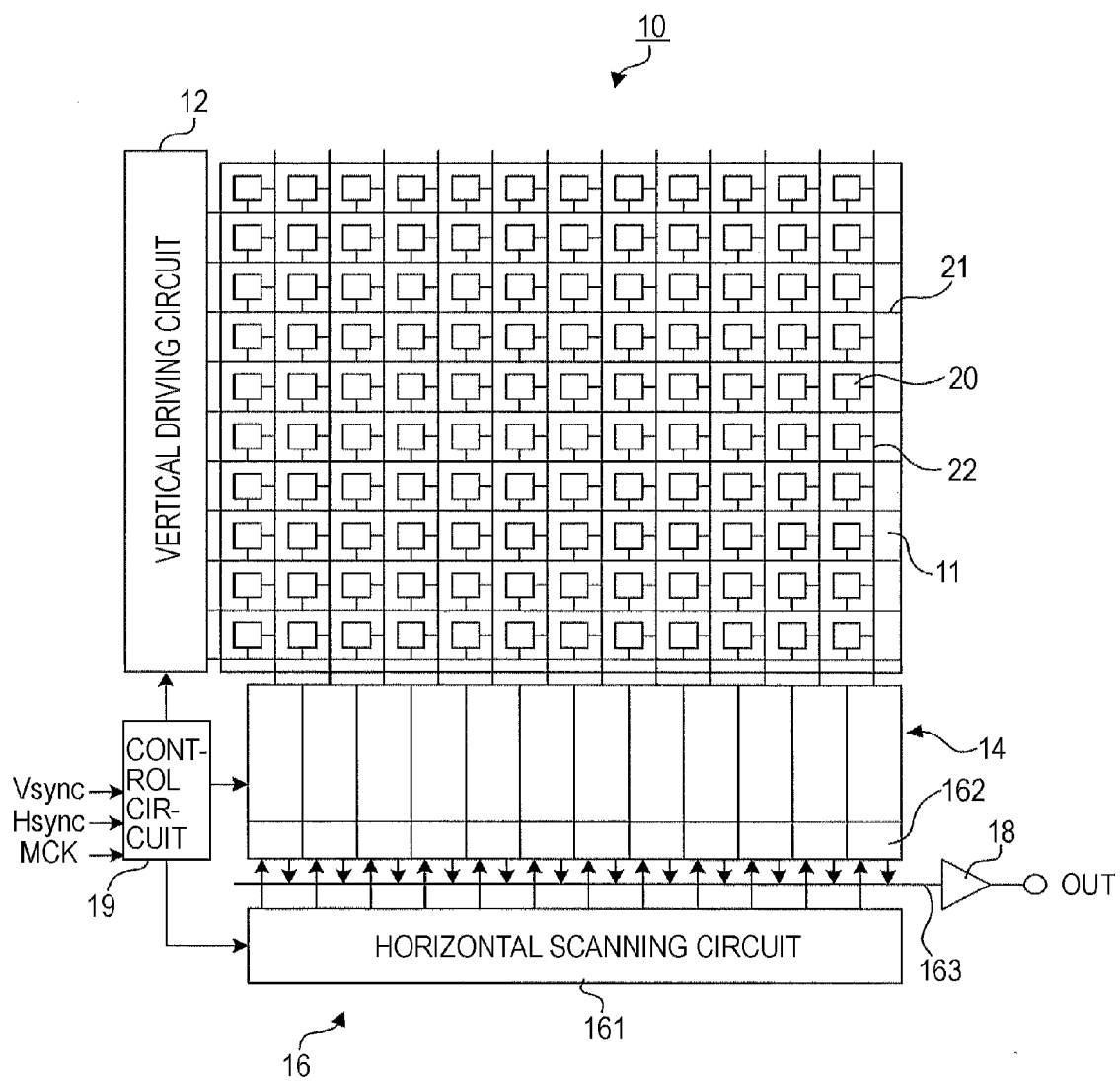
FIG. 9 is a system configuration diagram showing an overview of an exemplary configuration of a solid-state imaging device according to a second embodiment of the present invention.

FIG. 9 is a system configuration diagram showing an overview of an exemplary configuration of a solid-state imaging device according to a second embodiment of the present invention. In contrast to the system configuration according to the first embodiment, an illustrated solid-state imaging device 10 does not include the column circuit group 13, the horizontal driving circuit 15, and the output circuit 17. Other than those, the solid-state imaging device 10 includes elements similar to those of the first embodiment. In this embodiment, since a column circuit group 14 is provided only one end of vertical signal lines 22, there is only one column circuit for each column.

[First Scanning Method According to Second Embodiment]

Figure 10:
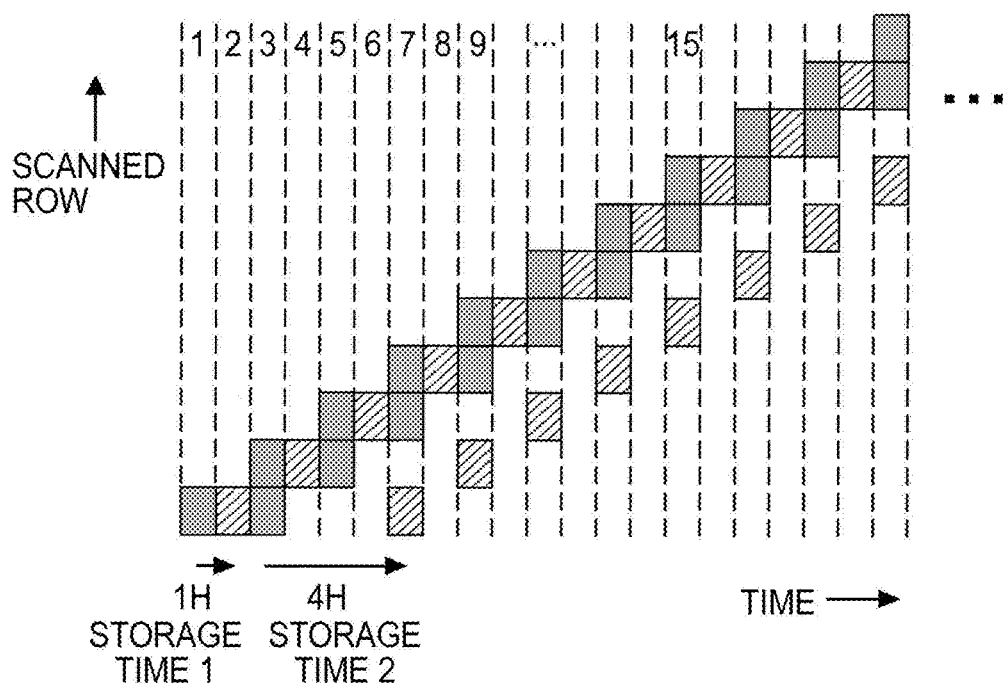
FIG. 10 is a diagram illustrating a first scanning method applicable to scanning of pixel rows using a solid-state imaging device according to a second embodiment of the present invention.

FIG. 10 is a diagram illustrating a first scanning method applicable to scanning of pixel rows using the solid-state imaging device 10 according to the second embodiment of the present invention. Numerals (1, 2, 3, 4, 5, 6, 7, 8, . . . ) at the top of the figure indicate the chronological scanning order. Only one read row is selected during 1H period, and it takes 2H periods to scan one row. In addition, two sets of shutter rows and two sets of read rows are scanned. In this embodiment, regarding each set of the shutter rows or the read rows, a preceding set is referred to as a first set, and a following set is referred to as a second set. As illustrated, when read rows of the first set are scanned during even-numbered (2nd, 4th, 6th, . . . ) periods, read rows of the second set are scanned during odd-numbered (7th, 9th, 11th, . . . ) periods.

In a scanning method in which only a first set of shutter rows is scanned, when an interval between a read row of the first set and the corresponding read row of the second set is set so that the read rows of the two sets are not simultaneously scanned during 1H period, a storage time 2 of read rows of the second set is equivalent to a product of 1H period and an odd number if a storage time 1 of read rows of the first set is set to, for example, 2H periods. Accordingly, a ratio of the storage time 1 to the storage time 2 cannot be set equal to a power of two. In addition, in the case of scanning three or more sets of read rows in parallel by expanding this configuration, the storage times and the ratio thereof are restricted due to the similar reason. Thus, many restrictions are imposed in choosing preferable values depending on shooting conditions and shooting has to be performed under an unpreferable condition, which undesirably leads to an increase in complexity of control and degradation of image quality.

The first scanning method according to the second embodiment allows the ratio of the storage times to be set to a power of two by inserting scanning of shutter rows of the second set immediately after (next to) read rows of the first set. More specifically, an interval of rows between a shutter row and a read row of the first set is set to one, whereas an interval between a shutter row and a read row of the second set is set to four. Additionally, the row next to the read row of the first set is set as the shutter row of the second set. That is, the next rows of read rows (in this example, the read rows of the first set) other than those of the second set, i.e., the final set, are treated as shutter rows of the next set (in this example, the second set). Accordingly, the read rows other than those of the final set are used as the shutter rows of the next set during the next 1H period.

In addition, in the first scanning method, a shutter row of the first set is scanned during the 1st period, and a read row of the first set is scanned during the 2nd period. During the 3rd period, the shutter rows of the first and second sets are scanned. During the 4th period, the read row of the first set is scanned. Subsequently, during the 5th period, the shutter rows of the first and second sets are scanned, and during the 6th period, the read row of the first set is scanned. During the 7th period, the shutter rows of the first and second sets and the read row of the second set are scanned. Thereafter, the read row of the first set is scanned during even-numbered periods, whereas during odd-numbered periods, the shutter rows of the first and second sets and the read row of the second set are scanned.

In the above-described scanning method, a period (the storage time 1) from the scanning of the shutter row to the scanning of the read row is equal to 1H period in the first set, whereas a period (the storage time 2) from the scanning of the shutter row to the scanning of the read row is equal to 4H periods, which is a quadruple of 1H, in the second set. Thus, a ratio of the storage time 1 of the first set to the storage time 2 of the second set is equal to 1:4, namely, a power of two.

[Second Scanning Method According to Second Embodiment]

Figure 11:
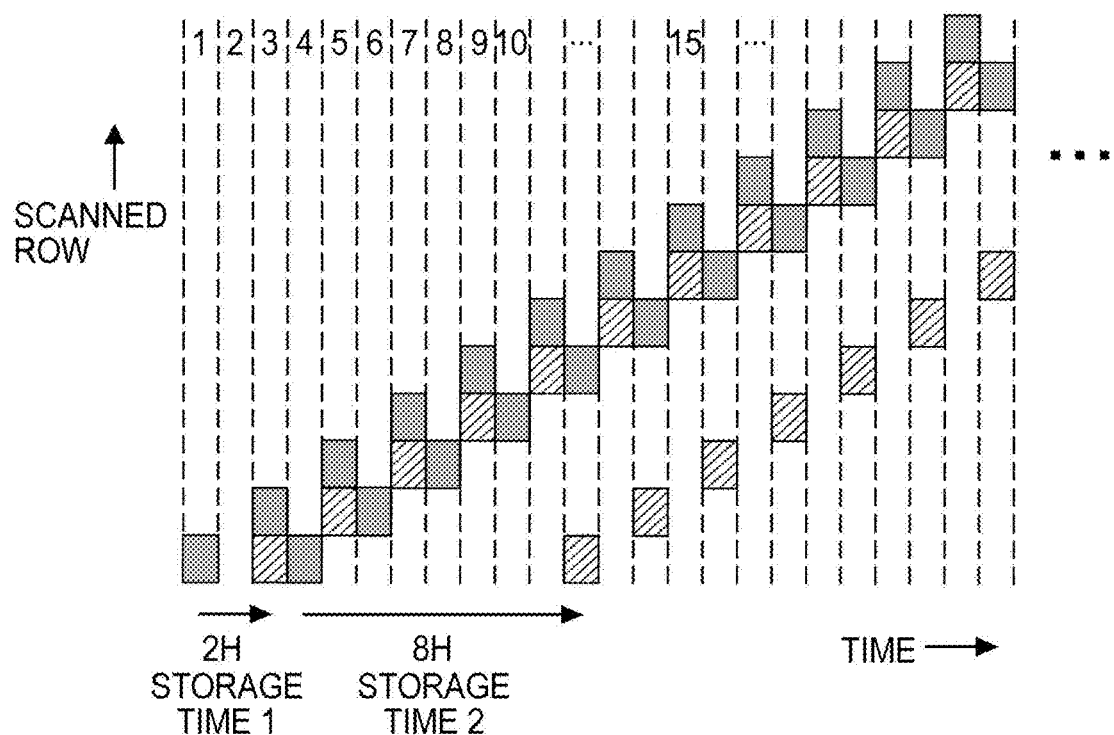
FIG. 11 is a diagram illustrating a second scanning method applicable to scanning of pixel rows using a solid-state imaging device according to a second embodiment of the present invention.

FIG. 11 is a diagram illustrating a second scanning method applicable to scanning of pixel rows using the solid-state imaging device 10 according to the second embodiment of the present invention. In the illustrated second scanning method, an interval of rows between a shutter row and a read row of a first set is set to two, whereas an interval between a shutter row and a read row of a second set is set to eight. A row next to the read row of the first set is used as the shutter row of the second set. That is, the next rows of read rows (in this example, read rows of the first set) other than the read rows of the second set, i.e., the final set, are treated as shutter rows of the next set (in this example, the second set). Accordingly, read rows other than those of the final set are used as shutter rows of the next set during the next 1H period.

In addition, in the second scanning method, during the 1st period, a shutter row of the first set is scanned. During the 2nd period, no rows are scanned. During the 3rd period, the shutter row and a read row of the first set are scanned, and during the 4th period, a shutter row of the second set is scanned. Subsequently, during the 5th period, the shutter row and the read row of the first set are scanned. During the 6th period, the shutter row of the second set is scanned. During the 7th period, the shutter row and the read row of the first set are scanned.

Then, during the 8th period, the shutter row of the second set is scanned. During the 9th period, the shutter row and the read row of the first set are scanned. Subsequently, during the 10th period, the shutter row of the second set is scanned, and during the 11th period, the shutter row and the read row of the first set are scanned. Then, during the 12th period, the shutter row and a read row of the second set are scanned. During the 13th period, the shutter row and the read row of the first set are scanned. Thereafter, the shutter row and the read row of the second set are scanned during even-numbered periods. During odd-numbered periods, the shutter row and the read row of the first set are scanned.

In the above-described scanning method, a period (the storage time 1) from the scanning of the shutter row to the scanning of the read row is equal to 2H periods, which is a double of 1H, in the first set, whereas a period (the storage time 2) from the scanning of the shutter row to the scanning of the read row is equal to 8H periods, which is an octuple of 1H, in the second set. Thus, a ratio of the storage time 1 of the first set to the storage time 2 of the second set is equal to 1:4, namely, a power of two, as in the case of the first scanning method.

Figure 12:
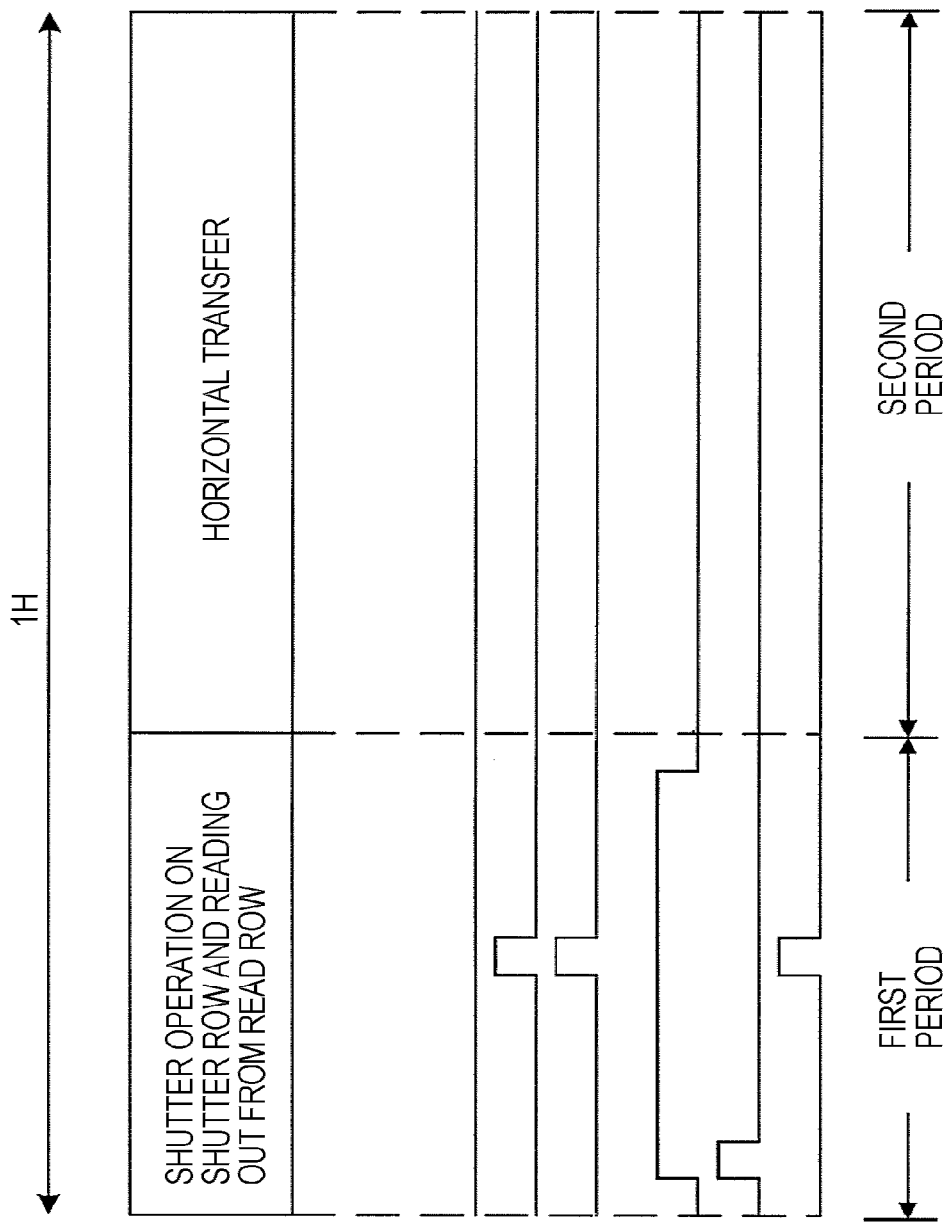
FIG. 12 is a timing chart illustrating operations performed during 1H period in a solid-state imaging device according to a second embodiment of the present invention.

In addition, the operations are performed during 1H period on the shutter rows and the read rows of the first and second sets at the timings shown in FIG. 12 when either the first scanning method (FIG. 10) or the second scanning method (FIG. 11) is employed. More specifically, 1H period is divided into two periods (i.e., a first period and a second period). During the first period, the shutter operation is performed on the shutter row in synchronization with the readout operation from the read row. During the second period, the horizontal driving circuit 16 performs horizontal transfer.

[Details of First Period]

On the read row, a selection pulse φSEL is caused to rise (to be at the high level) so as to turn on a selecting transistor 27, and a reset pulse φRST is caused to rise so as to turn on a reset transistor 25, thereby resetting an FD portion 28. Then, a potential (a reset level) of the FD portion 28 after the reset by the reset pulse φRST is supplied to a column circuit of the column circuit group 14 through a vertical signal line 22.

Then, on the read row, a transfer pulse φTRF is caused to rise so as to turn on a transfer transistor 24, thereby transferring photoelectrons stored in a photodiode 23 to the FD portion 28. A potential (a signal level) of the FD portion 28 after the transfer caused by the transfer pulse φTRF is supplied to the column circuit of the column circuit group 14 through the vertical signal line 22. Each column circuit of the column circuit group 14 calculates the difference between the reset level and the signal level, and advances the process to the next step.

On the other hand, on the shutter row, the reset transistor 25 and the transfer transistor 24 are simultaneously turned on by causing the reset pulse φRST and the transfer pulse φTRF to rise in synchronization with the transfer pulse φTRF of the read row while keeping the selecting transistor 27 turned off (while keeping the selection pulse φSEL at the low level), thereby resetting the photodiode 23.

[Details of Second Period]

The second period corresponds to a horizontal transfer period for transferring the output of each of the column circuits of the column circuit groups 14 to the output circuit 18 through the horizontal signal line 163.

In the above-described operations, since each of the transfer pulses φTRF of the shutter row and the read row is caused to synchronously fall during the first period, the shutter operation on the shutter row is performed in synchronization with the readout operation from the read row next to the shutter row. Thus, in the case of the first scanning method (FIG. 10), the storage time 1 of read rows of the first set is exactly equal to 1H, whereas the storage time 2 of read rows of the second set is exactly equal to 4H. In addition, in the case of the second scanning method (FIG. 11), the storage time 1 of read rows of the first set is exactly equal to 2H, whereas the storage time 2 of read rows of the second set is exactly equal to 8H. Thus, when either scanning method is employed, the ratio of the storage time 1 to the storage time 2 is exactly equal to an integral multiple.

Figure 13:
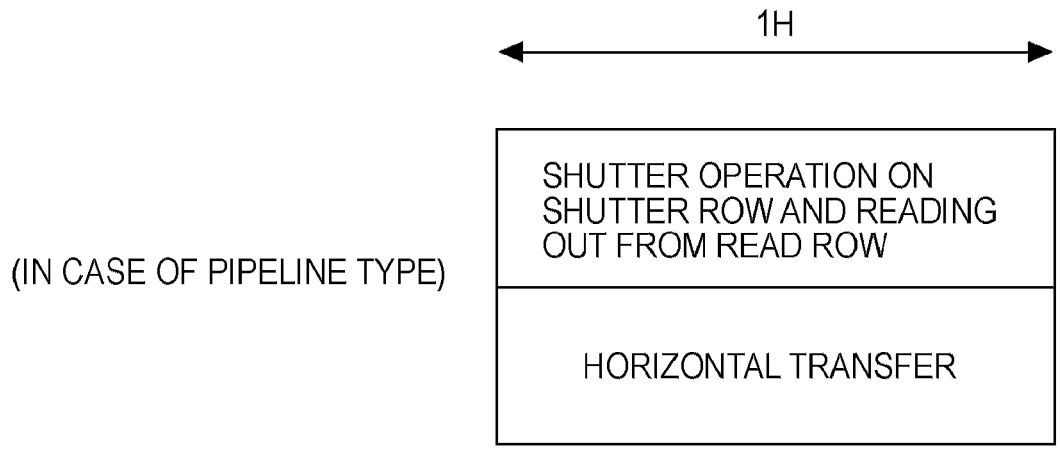
FIG. 13 is a diagram illustrating operations performed during 1H period in the case where pipeline column circuits are employed in a solid-state imaging device according to a second embodiment of the present invention.

FIG. 13 shows operations performed when pipeline column circuits are employed in the column circuit group 14. In either case, by synchronously performing the shutter operation on the shutter row and the readout operation from the read row during the same period, the ratio of the storage time 1 to the storage time 2 is set exactly to an integral multiple.

When the first scanning method shown in FIG. 10 is employed, a period during which two shutter rows (i.e., the shutter rows of the first and second sets) are scanned and a period during which no shutter rows are scanned are alternately repeated after the 3rd period in the scanning order. For example, during the 3rd period, two shutter rows are scanned. However, during the 4th period, only the read row is scanned and no shutter rows are scanned. When two shutter rows are scanned, the shutter rows of the first and second sets are scanned at the same time on the basis of the operation timings shown in FIG. 12. Additionally, it is desirable to provide dummy rows, so that the load for a power supply or the like does not change depending on the scanning order. More specifically, when two shutter rows are scanned, the dummy rows are not scanned, whereas, when the shutter rows are not scanned, it is desirable to scan the dummy rows. With this configuration, for example, a horizontal line that occurs when the power level is low can be suppressed.

[Third Scanning Method According to Second Embodiment]

Figure 14:
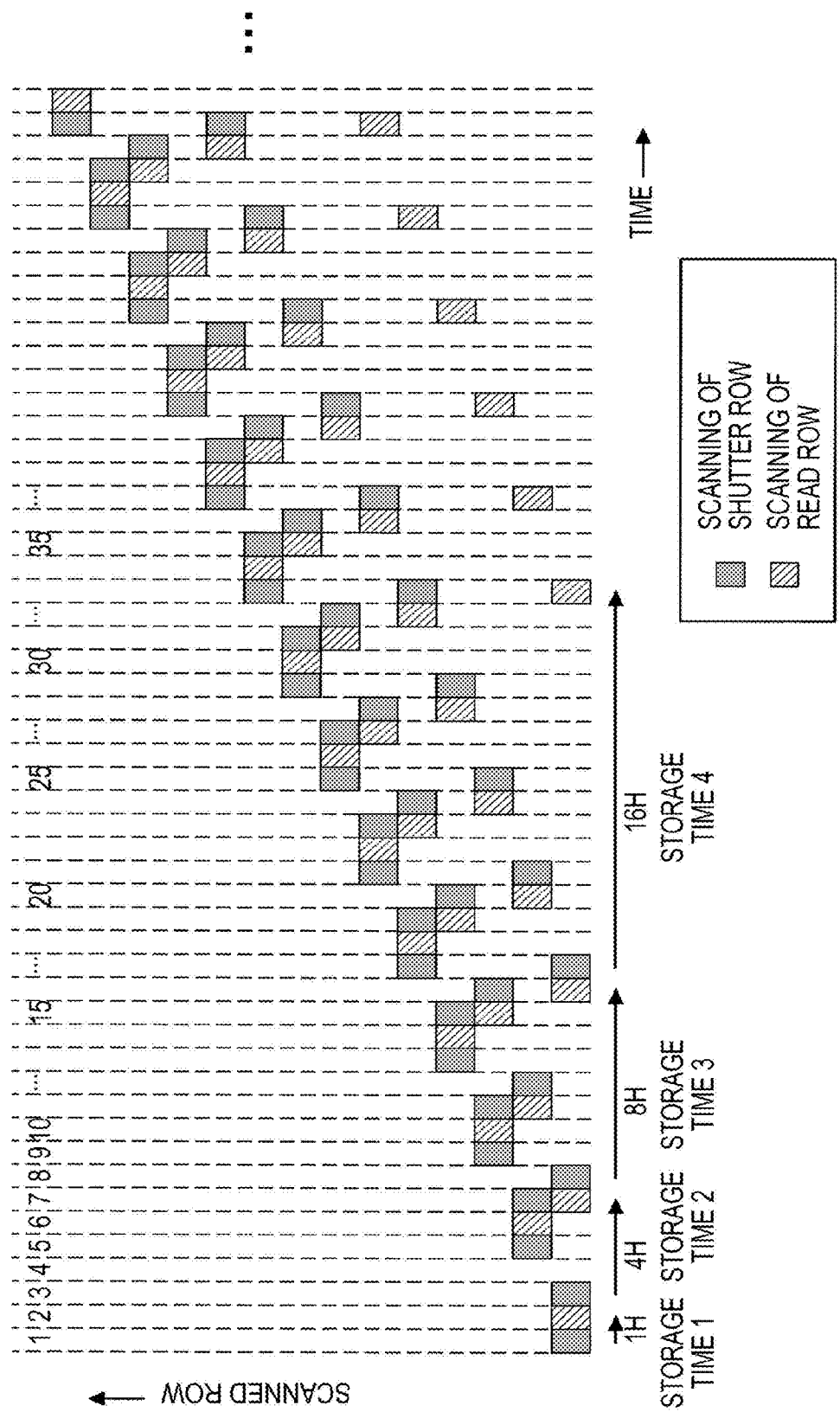
FIG. 14 is a diagram illustrating a third scanning method applicable to scanning of pixel rows using a solid-state imaging device according to a second embodiment of the present invention.

FIG. 14 is a diagram illustrating a third scanning method applicable to scanning of pixel rows using a solid-state imaging device according to the second embodiment of the present invention. Only one read row is selected during 1H period, and it takes 4H periods to scan one row. In addition, four sets of shutter rows and four sets of read rows are scanned. In this example, regarding each set of the shutter rows and the read rows, a preceding set is referred to as a first set, a set following the first set is referred to as a second set, a set following the second set is referred to as a third set, and a final set is referred to as a fourth set.

In the third scanning method according to the second embodiment, an interval of rows between a shutter row and a read row of the first set is set to one. An interval between a shutter row and a read row of the second set is set to four. An interval between a shutter row and a read row of the third set is set to eight. An interval between a shutter row and a read row of the fourth set is set to 16. A row next to the read row of the first set is set as the shutter row of the second set. A row next to the read row of the second set is set as the shutter row of the third set. A row next to the read row of the third set is set as the shutter row of the fourth set. That is, the next rows of read rows (in this example, read rows of the first to third sets) other than those of the fourth set, which is the final set, are set as shutter rows of the next set. Accordingly, read rows other than those of the final set are used as shutter rows of the next set during the next 1H period.

In addition, in the third scanning method, shutter rows and read rows of each set are scanned in the following procedure, so that two or more sets of read rows out of the four sets are not simultaneously scanned during 1H period. More specifically, during the 1st period, a shutter row of the first set is scanned, and during the 2nd period, a read row of the first set is scanned. During the 3rd period, a shutter row of the second set is scanned, and during the 4th period, no rows are scanned. Subsequently, during the 5th period, the shutter row of the first set is scanned, and during the 6th period, the read row of the first set is scanned. During the 7th period, the shutter row and a read row of the second set are scanned. During the 8th period, a shutter row of the third set is scanned.

Subsequently, during the 9th period, the shutter row of the first set is scanned, and during the 10th period, the read row of the first set is scanned. During the 11th period, the shutter row and the read row of the second set are scanned. During the 12th period, the shutter row of the third set is scanned. Then, during the 13th period, the shutter row of the first set is scanned, and during the 14th period, the read row of the first set is scanned. During the 15th period, the shutter row and the read row of the second set are scanned. During the 16th period, the shutter row and a read row of the third set are scanned.

Then, during the 17th period, the shutter rows of the first and fourth sets are scanned, and during the 18th period, the read row of the first set is scanned. During the 19th period, the shutter row and the read row of the second set are scanned, and during the 20th period, the shutter row and the read row of the third set are scanned. During the 21st period, the shutter rows of the first and fourth sets are scanned, and during the 22nd period, the read row of the first set is scanned. During the 23rd period, the shutter row and the read row of the second set are scanned, and during the 24th period, the shutter row and the read row of the third sets are scanned.

Subsequently, during the 25th period, the shutter rows of the first and fourth sets are scanned, and during the 26th period, the read row of the first set is scanned. During the 27th period, the shutter row and the read row of the second set are scanned, and during the 28th period, the shutter row and the read row of the third set are scanned. Then, during the 29th period, the shutter rows of the first and fourth sets are scanned, and during the 30th period, the read row of the first set is scanned. During the 31st period, the shutter row and the read row of the second set are scanned, and during the 32nd period, the shutter row and the read row of the third set are scanned.

Then, during the 33rd period, the shutter rows of the first and fourth sets and a read row of the fourth set are scanned, and during the 34th period, the read row of the first set is scanned. During the 35th period, the shutter row and the read row of the second set are scanned, and during the 36th period, the shutter row and the read row of the third set are scanned. Thereafter, scanning operations similar to those performed during the 33rd to 36th periods are repeated every 4H periods.

In the above-described scanning method, regarding the first set, a period (the storage time 1) from the scanning of a shutter row of the first set to the scanning of a read row of the first set is set to 1H period. Regarding the second set, a period (the storage time 2) from the scanning of a shutter row of the second set to the scanning of a read row of the second set is set to 4H periods, which is a quadruple of 1H. Regarding the third set, a period (the storage time 3) from the scanning of a shutter row of the third set to the scanning of a read row of the third set is set to 8H periods, which is an octuple of 1H. Regarding the fourth set, a period (the storage time 4) from the scanning of a shutter row of the fourth set to the scanning of a read row of the fourth set is set to 16H periods, which is sixteenfold of 1H. Thus, the ratio of the storage time 1 of the first set to the storage time 2 of the second set to the storage time 3 of the third set to the storage time 4 of the fourth set is equal to 1:4:8:16, namely, a power of two.

In addition, regarding the operations performed during 1H period, timings of scanning of the shutter rows and the read rows of the first to fourth sets (timings of the rise and the fall of the pulses) are set as shown in FIG. 12. Accordingly, the storage time 1 of read rows of the first set is exactly equal to 1H, whereas the storage time 2 of read rows of the second set is exactly equal to 4H. In addition, the storage time 3 of read rows of the third set is exactly equal to 8H, whereas the storage time 4 of read rows of the fourth set is exactly equal to 16H. Thus, the ratio of the storage time 1 to the storage time 2 to the storage time 3 to the storage time 4 is exactly equal to an integral multiple.

A case where the number of sets of read rows is a power of two (in the above-described examples, two sets and four sets) has been described. Hereafter, a case where the number of sets of read rows is not a power of two will be described. For example, a case where the number of sets of read rows is three will be described. With three sets of read rows, if storage times are changed for each set of read rows (for example, changed from 1H, 4H, 8H to 2H, 8H, 16H), a manner of inserting shutter rows also changes, which may slightly affect operations, for example.

Accordingly, in an embodiment of the present invention, read rows of each of the three sets are set so as to be scanned during the ith periods, where i is a number belonging to one of residue classes of 3 (e.g., 3 nth, (3m+1)th, or (3p+2)th, where n, m, and p are integers). This can be similarly applied to other integers equal to or greater than two. For example, in the case of using two sets of read rows, read rows of the first set are scanned during the 2nd, the 4th, the 6th, and the 8th, . . . periods (i.e., turns represented by numbers whose remainder when divided by 2 is 0), whereas read rows of the second set are scanned during the 7th, the 9th, the 11th, and 13th, . . .

periods (i.e., turns represented by numbers whose remainder when divided by 2 is 1) in the scanning method shown in FIG. 10. In addition, in the scanning method shown in FIG. 11, read rows of the first set are scanned during the 3rd, the 5th, the 7th, and the 9th, . . . periods (i.e., turns represented by numbers whose remainder when divided by 2 is 1), whereas read rows of the second set are scanned during the 12th, the 14th, the 16th, and 18th, . . . periods (i.e., turns represented by numbers whose remainder when divided by 2 is 0).

Furthermore, in the scanning method shown in FIG. 14, the read rows of the first set are scanned during the 2nd, the 6th, the 10th, and the 14th, . . . periods (i.e., turns represented by numbers whose remainder when divided by 4 is 2), whereas the read rows of the second set are scanned during the 7th, the 11th, the 15th, and 19th, . . . periods (i.e., turns represented by numbers whose remainder when divided by 4 is 3). Additionally, the read rows of the third set are scanned during the 16th, the 20th, the 24th, and the 28th, . . . periods (i.e., turns represented by numbers whose remainder when divided by 4 is 0), whereas the read rows of the fourth set are scanned during the 33rd, the 37th, the 41st, and the 45th, . . . periods (i.e., turns represented by numbers whose remainder when divided by 4 is 1).

That is, in embodiments of the present invention, regarding q (where, "q" is an integer equal to or greater than 2) sets of read rows, each of the "q" sets of read rows are scanned so that a number indicating an order of scanning each of the "q" sets of read rows belongs to different residue classes of q, and up to "q" sets of shutter rows are appropriately inserted between the first set of read rows and the final set of read rows to obtain preferable storage times, thereby realizing preferable storage times (a relationship that a ratio of the storage times of the sets of read rows is equal to a power of two). In particular, when the number of sets of read rows "q" is equal to a power of two, "q" sets of shutter rows (the same number as that of sets of read rows) are provided so that shutter rows and read rows correspond one-to-one and read rows other than those of the final set (the last set) are used as shutter rows during the next 1H period. It is preferable to perform selective scanning of pixel rows while applying such a predetermined rule in terms of saving the storage times.

[Fourth Scanning Method According to Second Embodiment]

Figure 15:
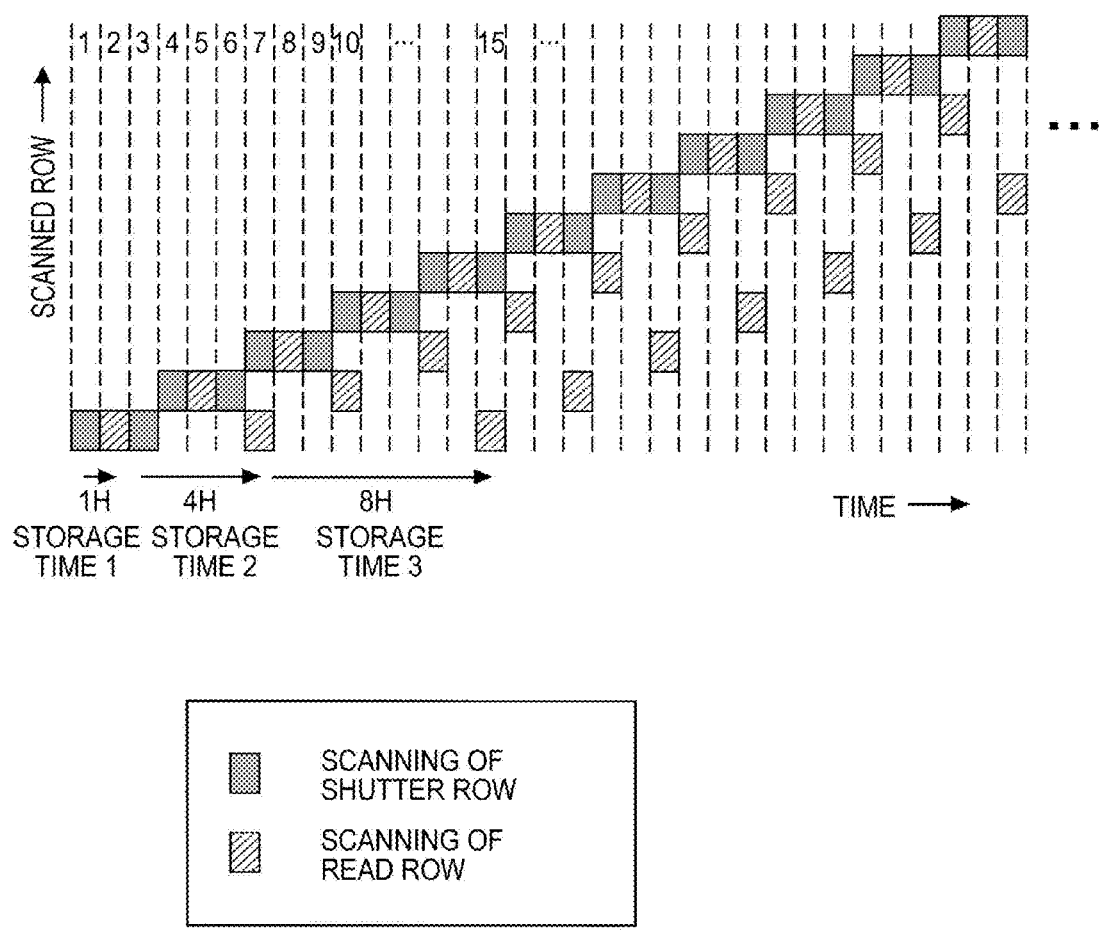
FIG. 15 is a diagram illustrating a fourth scanning method applicable to scanning of pixel rows using a solid-state imaging device according to a second embodiment of the present invention.

FIG. 15 is a diagram illustrating a fourth scanning method applicable to scanning of pixel rows using a solid-state imaging device according to the second embodiment of the present invention. Only one read row is selected during 1H period, and it takes 3H periods to scan one row. In addition, two sets of shutter rows and three sets of read rows are scanned. In this example, regarding each set of the shutter rows and the read rows, a preceding set is referred to as a first set, a set following the first set is referred to as the second set, and a set following the second set is referred to as a third set.

In the fourth scanning method according to the second embodiment, an interval of rows between a shutter row and a read row of the first set is set to one. An interval between a shutter row and a read row of the second set is set to four. An interval between the read row of the second set and a read row of the third set is set to eight. A row next to the read row of the first set is set as the shutter row of the second set.

In addition, in the fourth scanning method, shutter rows and read rows of each set are scanned in the following procedure, so that two or more sets of read rows out of the three sets are not simultaneously scanned during 1H period. More specifically, during the 1st period, a shutter row of the first set is scanned, and during the 2nd period, a read row of the first set is scanned. During the 3rd period, a shutter row of the second set is scanned. Then, during the 4th period, the shutter row of the first set is scanned, and during the 5th period, the read row of the first set is scanned. During the 6th period, the shutter row of the second set is scanned.

Subsequently, during the 7th period, the shutter row of the first set and a read row of the second set are scanned, and during the 8th period, the read row of the first set is scanned. During the 9th period, the shutter row of the second set is scanned. Then, during the 10th period, the shutter row of the first set and the read row of the second set are scanned. During the 11th period, the read row of the first set is scanned, and during the 12th period, the shutter row of the second set is scanned.

Subsequently, during the 13th period, the shutter row of the first set and the read row of the second set are scanned. During the 14th period, the read row of the first set is scanned, and during the 15th period, the shutter row of the second set and a read row of the third set are scanned. Thereafter, scanning operations similar to those performed during the 13th to 15th periods are repeated every 3H periods.

In the above-described scanning method, regarding the first set, a period (the storage time 1) from the scanning of a shutter row of the first set to the scanning of a read row of the first set is equal to 1H period. Regarding the second set, a period (the storage time 2) from the scanning of a shutter row of the second set to the scanning of a read row of the second set is equal to 4H periods, which is a quadruple of 1H. Regarding the third set, a period (the storage time 3) from the scanning of the read row of the second set to the scanning of a read row of the third set is equal to 8H periods, which is an octuple of 1H. Thus, the ratio of the storage time 1 of the first set to the storage time 2 of the second set to the storage time 3 of the third set is equal to 1:4:8, namely, a power of two.

In addition, in the operations performed during 1H period, timings of scanning of the shutter rows and the read rows of the first to third sets (timings of the rise and the fall of the pulses) are set as shown in FIG. 12. Accordingly, the storage time 1 of read rows of the first set is set exactly to 1H, whereas the storage time 2 of read rows of the second set is set exactly to 4H. In addition, the storage time 3 of read rows of the third set is set exactly to 8H. Thus, the ratio of the storage time 1 to the storage time 2 to the storage time 3 is exactly equal to an integral multiple.

Furthermore, in this scanning method, the read rows of the first set are scanned during the 2nd, the 5th, the 8th, and the 11th, . . . periods (i.e., turns represented by numbers whose remainder when divided by 3 is 2), whereas the read rows of the second set are scanned during the 7th, the 10th, the 13th, and 16th, . . . periods (i.e., turns represented by numbers whose remainder when divided by 3 is 1). Additionally, the read rows of the third set are scanned during the 15th, the 18th, the 21st, and the 24th, . . . periods (i.e., turns represented by numbers whose remainder when divided by 3 is 0).

[Fifth Scanning Method According to Second Embodiment]

Figure 16:
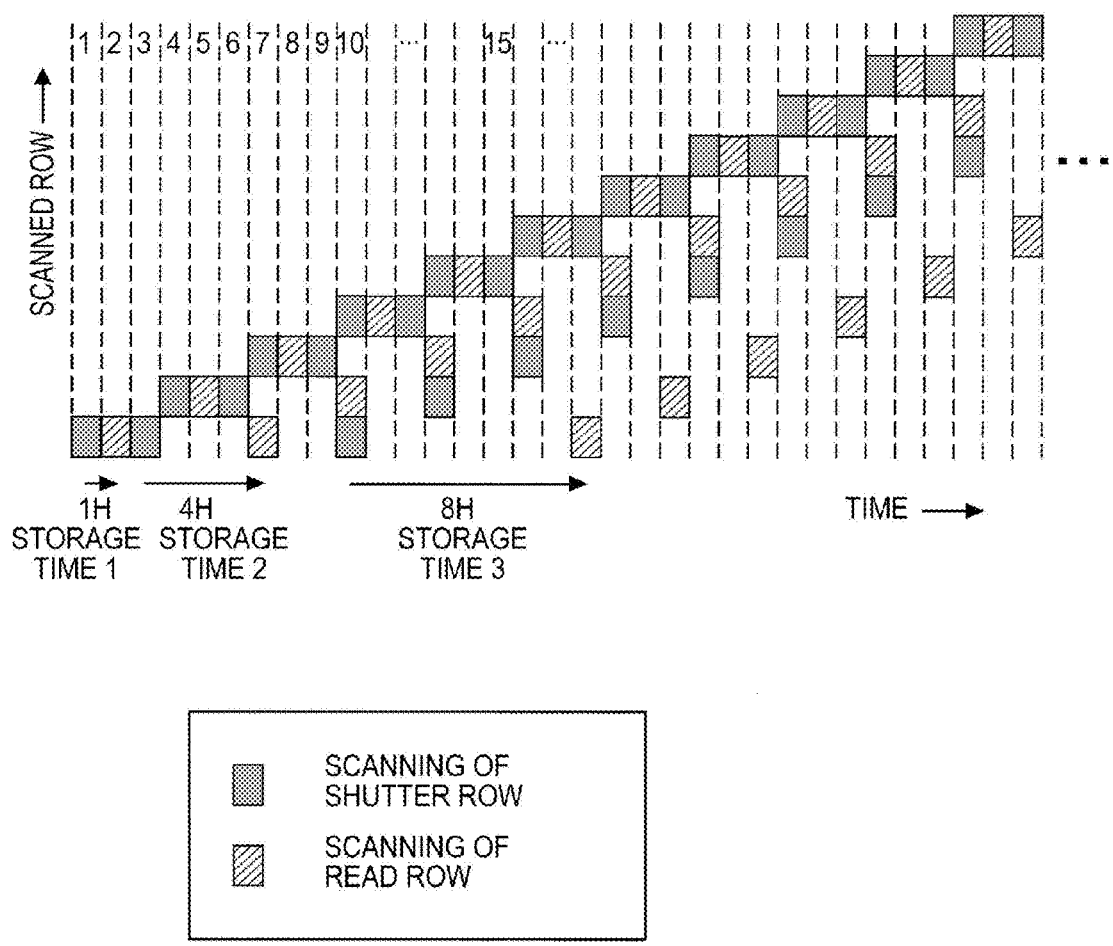
FIG. 16 is a diagram illustrating a fifth scanning method applicable to scanning of pixel rows using a solid-state imaging device according to a second embodiment of the present invention.

FIG. 16 is a diagram illustrating a fifth scanning method applicable to scanning of pixel rows using a solid-state imaging device according to the second embodiment of the present invention. Only one read row is selected during 1H period, and it takes 3H period to scan one row. In addition, three sets of shutter rows and three sets of read rows are scanned. In this example, regarding each set of the shutter rows and the read rows, a preceding set is referred to as a first set, a set following the first set is referred to as the second set, and a set following the second set is referred to as a third set.

In the fifth scanning method according to the second embodiment, an interval of rows between a shutter row and a read row of the first set is set to one. An interval between a shutter row and a read row of the second set is set to four. An interval between a shutter row and a read row of third set is set to eight. A row next to the read row of the first set is set as the shutter row of the second set. A row three rows behind the read row of the second set is set as the shutter row of the third set.

In addition, in the fifth scanning method, shutter rows and read rows of each set are scanned in the following procedure, so that two or more sets of read rows out of the three sets are not simultaneously scanned during 1H period. More specifically, during the 1st period, a shutter row of the first set is scanned, and during the 2nd period, a read row of the first set is scanned. During the 3rd period, a shutter row of the second set is scanned. Then, during the 4th period, the shutter row of the first set is scanned, and during the 5th period, the read row of the first set is scanned. During the 6th period, a shutter row of the second set is scanned.

Subsequently, during the 7th period, the shutter row of the first set and a read row of the second set are scanned, and during the 8th period, the read row of the first set is scanned. During the 9th period, the shutter row of the second set is scanned. Then, during the 10th period, the shutter row of the first set, the read row of the second set, and a shutter row of the third set are scanned. During the 11th period, the read row of the first set is scanned, and during the 12th period, the shutter row of the second set is scanned.

Subsequently, during the 13th period, the shutter row of the first set, the read row of the second set, and the shutter row of the third set are scanned. During the 14th period, the read row of the first set is scanned, and during the 15th period, the shutter row of the second set is scanned. Then, during the 16th period, the shutter row of the first set, the read row of the second set, and the shutter row of the third set are scanned. During the 17th period, the read row of the first set is scanned, and during the 18th period, the shutter row of the second set and a read row of the third set are scanned. Thereafter, scanning operations similar to those performed during the 16th to 18th periods are repeated every 3H periods.

In the above-described scanning method, regarding the first set, a period (the storage time 1) from the scanning of a shutter row of the first set to the scanning of a read row of the first set is equal to 1H period. Regarding the second set, a period (the storage time 2) from the scanning of a shutter row of the second set to the scanning of a read row of the second set is equal to 4H periods, which is a quadruple of 1H. Regarding the third set, a period (the storage time 3) from the scanning of a shutter row of the third set to the scanning of a read row of the third set is equal to 8H periods, which is an octuple of 1H. Thus, the ratio of the storage time 1 of the first set to the storage time 2 of the second set to the storage time 3 of the third set is equal to 1:4:8, namely, a power of two.

In addition, in the operations performed during 1H period, timings of scanning of shutter rows and read rows of the first to third sets (timings of the rise and the fall of the pulses) are set as shown in FIG. 12. Accordingly, the storage time 1 of read rows of the first set is set exactly to 1H, whereas the storage time 2 of read rows of the second set is set exactly to 4H. In addition, the storage time 3 of read rows of the third set is set exactly to 8H. Thus, the ratio of the storage time 1 to the storage time 2 to the storage time 3 is equal exactly to an integral multiple.

Furthermore, in this scanning method, read rows of the first set are scanned during the 2nd, the 5th, the 8th, and the 11th, . . . periods (i.e., turns represented by numbers whose remainder when divided by 3 is 2), whereas read rows of the second set are scanned during the 7th, the 10th, the 13th, and the 16th, . . . periods (i.e., turns represented by numbers whose remainder when divided by 3 is 1). Additionally, read rows of the third set are scanned during the 18th, the 21st, the 24th, and the 27th . . . periods (i.e., turns represented by numbers whose remainder when divided by 3 is 0).

In the above-described embodiments, a solid-state imaging device for detecting the intensity of incident light coming through a subject is cited as an example of a physical quality detecting device for detecting a physical quantity supplied from the outside. However, the present invention is not limited to the solid-state imaging device, and is generally applied to physical quantity detecting devices having pixels, for detecting electromagnetic waves other than visible light, particles, distribution of pressure and chemical substances as a time-proportional signals, two-dimensionally arranged in a matrix.

APPLICATION EXAMPLES

The solid-state imaging device 10 according to the foregoing embodiments can be preferably employed in imaging apparatuses, such as digital still cameras and video cameras, as an imaging device (an image input device) thereof.

Herein, an imaging apparatus includes a solid-state imaging device serving as an imaging device and an optical system, such as lenses, for forming an optical image of a subject on an imaging surface (receiving surface) of the solid-state imaging device, and indicates a camera module mounted and used on an electronic device such as a mobile phone, and a camera system such as a digital still camera and a video camera that including the camera module.

Figure 17:
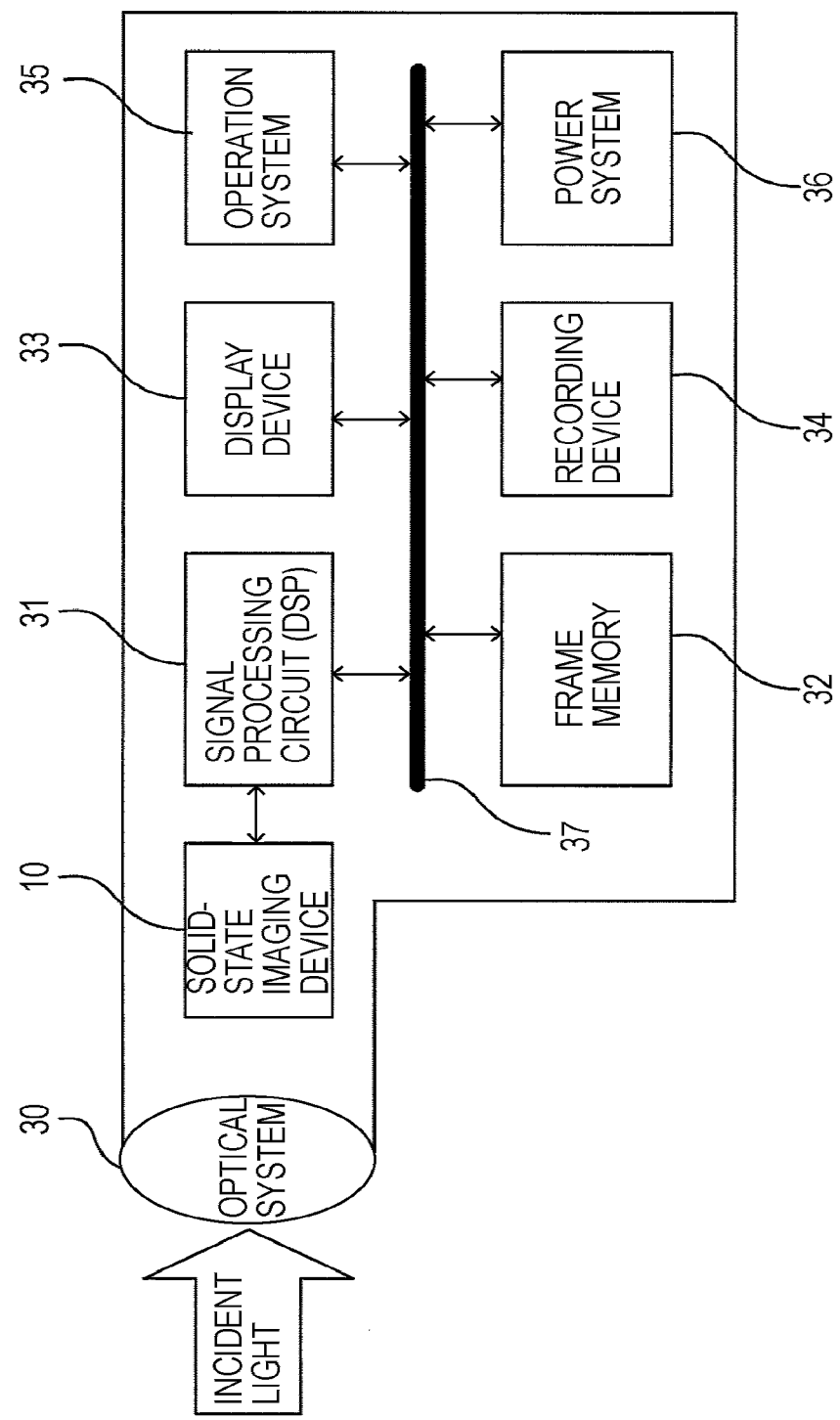
FIG. 17 is a block diagram showing an example of a configuration of an imaging apparatus according to an embodiment of the present invention.
Figure 18B:
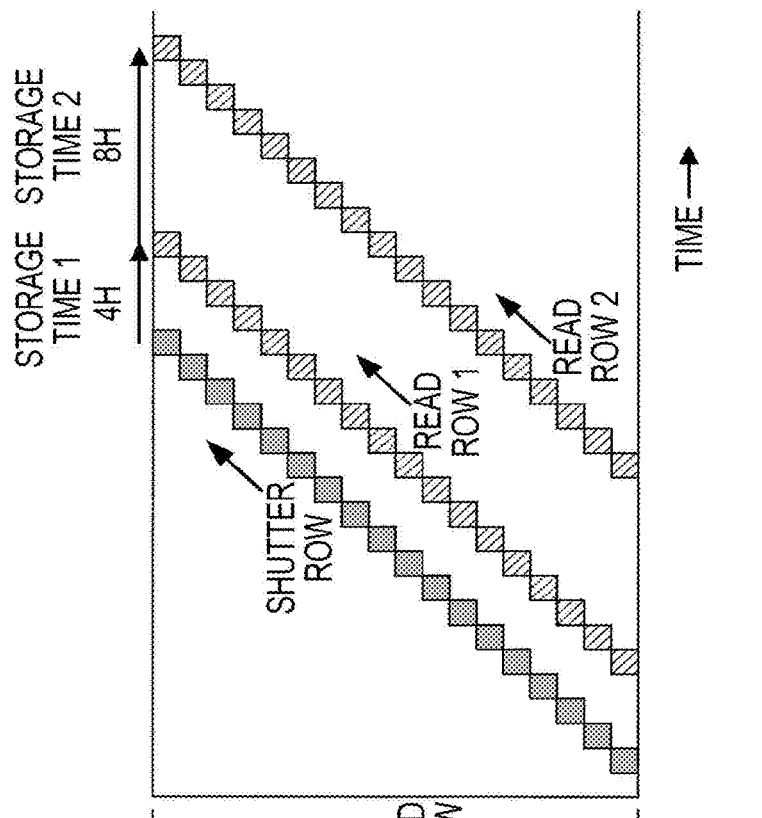
FIGS. 18A and 18B are diagrams illustrating a known scanning method.
Figure 18A:
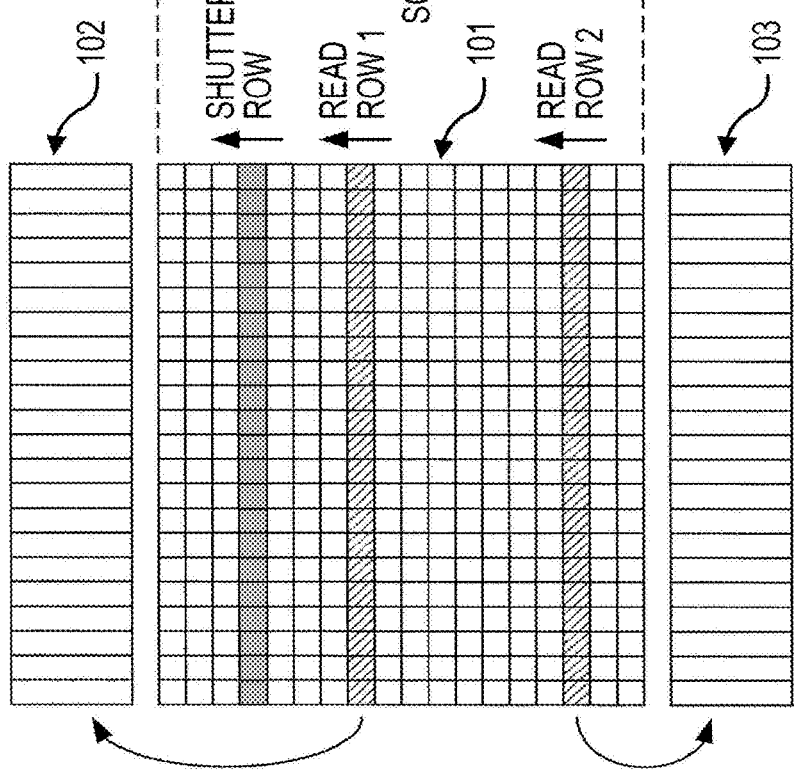
Figure 19A:
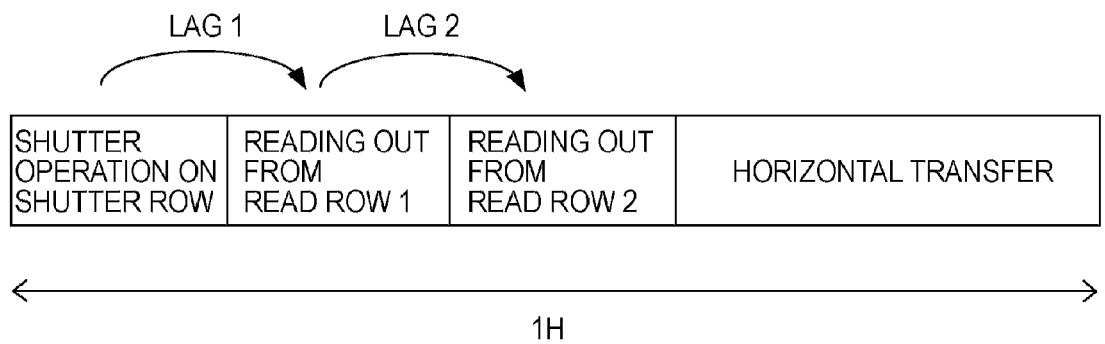
FIGS. 19A and 19B are diagrams illustrating operations performed during 1H period in a known scanning method.
Figure 19B:
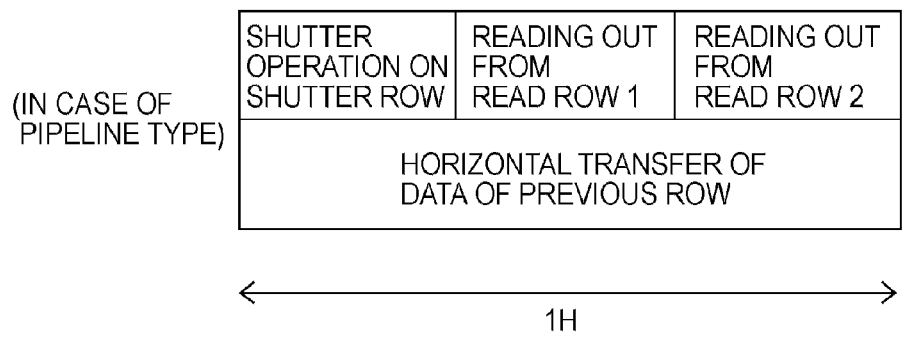

FIG. 17 is a block diagram showing an example of a configuration of an imaging apparatus according to an embodiment of the present invention. The imaging apparatus according to this embodiment has an optical system 30 including lenses, a solid-state imaging device 10, a signal processing circuit 31 constituted by a digital signal processor (DSP), a frame memory 32, a display device 33, a recording device 34, an operation system 35, and a power system 36. The signal processing circuit 31, the frame memory 32, the display device 33, the recording device 34, the operation system 35, and the power system 36 among these elements are connected to a common bus 37.

The optical system 30 leads an optical image (incident light) from a subject to an imaging surface (a pixel array) of the solid-state imaging device 10. The solid-state imaging device 10 converts the optical image formed on the imaging surface by the optical system 30 into electric signals on a pixel-by-pixel basis. The solid-state imaging device 10 may be formed as one chip, or as a module having imaging functions packaged with the signal processing circuit 31 and the frame memory 32.

The signal processing circuit 31 combines image signals output from the solid-state imaging device 10 through scanning (readout of pixel signals) performed a plurality of times with different storage times (sensitivities), thereby generating image signals with a wide dynamic range. The frame memory 32 is used for temporarily storing the image signals processed by the signal processing circuit 31.

The display device 33 displays images corresponding to the image signals that are output as results of the processing performed by the signal processing circuit 31. The recording device 34 records the image signals on recording media, such as, for example, magnetic tapes and magnetic disks. The operation system 35 is used for operating the imaging apparatus. The power system 36 supplies electric power used for driving the imaging apparatus.

In this imaging apparatus, since the signal processing circuit 31 can accurately perform dynamic range extending processing using imaging signals read out through a plurality of scanning operations with a small amount of calculation by setting a ratio of storage times of a plurality of sets of read rows to a power of two, both high image quality and low power consumption can be realized.

It should be understood by those skilled in the art that various modifications, combinations, sub-combinations and alterations may occur depending on design requirements and other factors insofar as they are within the scope of the appended claims or the equivalents thereof.

What is claimed is:

1. A physical quantity detecting device comprising:
   a pixel array having a plurality of pixels arranged in a two-dimensional matrix having a plurality of rows and columns, each pixel converting a physical quantity supplied from an outside into an electric signal and storing the electric signal, each pixel constituted by a buried photodiode; and
   a scanning unit that (a) scans a plurality of read rows so that storage times of the electric signals in the plurality of read rows are different and (b) performs an electronic shutter operation on a shutter row in synchronization with a readout operation on a corresponding read row out of the plurality of read rows during 1H period that is a unit of time of scanning, the readout operation for reading out the electric signal stored in each of the pixels being performed on the read row, and the electronic shutter operation for resetting the electric signal stored in each of the pixels being performed on the shutter row, wherein,
      the scanning unit performs the electronic shutter operation on the shutter row in synchronization with the readout operation on the corresponding read row during the 1H period such that at least a fall of a transfer pulse provided to the shutter row is synchronized with a fall of a transfer pulse provided to the corresponding read row.

2. The device according to claim 1, wherein in connection with a read row other than a first read row, the scanning unit sets a previously read row as a corresponding shutter row.

3. The device according to claim 1, wherein the scanning unit scans at least one shutter row after scanning a first read row and before scanning a last read row.

4. The device according to claim 1, wherein in connection with a read row other than a first read row, a next row adjacent to a previously read row is set as a corresponding shutter row.

5. The device according to claim 1, wherein a ratio of storage times of the plurality of read rows is a power of two.

6. A solid-state imaging device comprising:
   a pixel array having a plurality of pixels arranged in a two-dimensional matrix having a plurality of rows and columns, each pixel converting incident light into an electric signal and storing the electric signal, each pixel constituted by a buried photodiode; and
   a scanning unit that (a) scans a plurality of read rows so that storage times of the electric signals in the plurality of read rows are different and (b) performs an electronic shutter operation on a shutter row in synchronization with a readout operation on a corresponding read row out of the plurality of read rows during 1H period that is a unit of time of scanning, the readout operation for reading out the electric signal stored in each of the pixels being performed on the read row, and the electronic shutter operation for resetting the electric signal stored in each of the pixels being performed on the shutter row, wherein,
      the scanning unit performs the electronic shutter operation on the shutter row in synchronization with the readout operation on the corresponding read row during the 1H period such that at least a fall of a transfer pulse provided to the shutter row is synchronized with a fall of a transfer pulse provided to the corresponding read row.

7. An imaging apparatus comprising:
   a pixel array having a plurality of pixels arranged in a two-dimensional matrix having a plurality of rows and columns, each pixel converting incident light into an electric signal and storing the electric signal, each pixel constituted by a buried photodiode;
   an optical system for guiding the incident light from a subject to the pixel array;
   a scanning unit that (a) scans a plurality of read rows so that storage times of the electric signals in the plurality of read rows are different and (b) performs an electronic shutter operation on a shutter row in synchronization with a readout operation on a corresponding read row out of the plurality of read rows during 1H period that is a unit of time of scanning, the readout operation for reading out the electric signal stored in each of the pixels being performed on the read row, and the electronic shutter operation for resetting the electric signal stored in each of the pixels being performed on the shutter row; and
   a signal processing unit for processing the electric signals read out from each of the pixels by the scanning unit, wherein,
      the scanning unit performs the electronic shutter operation on the shutter row in synchronization with the readout operation on the corresponding read row during the 1H period such that at least a fall of a transfer pulse provided to the shutter row is synchronized with a fall of a transfer provided to the corresponding read row.

* * * * *